United States Patent
Jeon et al.

(10) Patent No.: US 10,839,806 B2
(45) Date of Patent: Nov. 17, 2020

(54) VOICE PROCESSING METHOD AND ELECTRONIC DEVICE SUPPORTING THE SAME

(71) Applicant: Samsung Electronics Co., Ltd., Gyeonggi-do (KR)

(72) Inventors: Joo Hyuk Jeon, Seoul (KR); Woo Up Kwon, Seoul (KR); Jin Woo Park, Gyeonggi-do (KR); Kyoung Gu Woo, Seoul (KR); Eun Taek Lim, Gyeonggi-do (KR); Kyung Hak Hyun, Gyeonggi-do (KR); Dong Ho Jang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 189 days.

(21) Appl. No.: 16/029,743

(22) Filed: Jul. 9, 2018

(65) Prior Publication Data
US 2019/0013024 A1    Jan. 10, 2019

(30) Foreign Application Priority Data
Jul. 10, 2017  (KR) .......................... 10-2017-0087373

(51) Int. Cl.
*G10L 15/22*  (2006.01)
*G10L 15/26*  (2006.01)
(Continued)

(52) U.S. Cl.
CPC .............. *G10L 15/26* (2013.01); *G06F 3/167* (2013.01); *G06F 40/274* (2020.01); *G06F 40/35* (2020.01);
(Continued)

(58) Field of Classification Search
CPC .... G06F 40/30; G06F 16/3344; G06F 40/205; G06F 16/243; G06F 40/20;
(Continued)

(56) References Cited

U.S. PATENT DOCUMENTS 8,660,849 B2    2/2014  Gruber et al.
8,670,979 B2    3/2014  Gruber et al.
(Continued)

FOREIGN PATENT DOCUMENTS

KR    10-1579292 B1    12/2015
WO    2015/200422 A1    12/2015

OTHER PUBLICATIONS

International Search Report dated Sep. 21, 2018.

*Primary Examiner* — Huyen X Vo
(74) *Attorney, Agent, or Firm* — Cha & Reiter, LLC.

(57) ABSTRACT

An electronic device and method are disclosed herein. The electronic device includes a network interface and processor. The processor implements the method, including receiving a voice input through a network interface as transmitted from a first external device, including a request to execute a function using at least one application which is not indicated in the voice input, extracting a first text from the voice input by executing automatic speech recognition (ASR), when the at least one application is identified based on the first text, transmitting, through the network interface to the first external device, second data associated with the identified at least one application for display by the first external device, and when the at least one application is not identified based at least in part on the first text, reattempting identification of the at least one application by executing natural language understanding (NLU) on the first text.

18 Claims, 17 Drawing Sheets

(51) Int. Cl.
  *G10L 15/16* (2006.01)
  *G06F 3/16* (2006.01)
  *G06F 40/35* (2020.01)
  *G06F 40/40* (2020.01)
  *G06F 40/274* (2020.01)
  *H04W 88/02* (2009.01)

(52) U.S. Cl.
  CPC .............. *G06F 40/40* (2020.01); *G10L 15/16* (2013.01); *G10L 15/22* (2013.01); *G10L 2015/223* (2013.01); *G10L 2015/228* (2013.01); *H04W 88/02* (2013.01)

(58) Field of Classification Search
  CPC ............... G10L 2015/223; G10L 15/26; G10L 2015/228; G10L 15/265; G10L 15/22; G10L 15/1822; G10L 15/00; G10L 17/22
  See application file for complete search history.

(56) References Cited

U.S. PATENT DOCUMENTS

| | | | |
|---|---|---|---|
| 8,706,503 B2 | 4/2014 | Cheyer et al. | |
| 8,731,942 B2 | 5/2014 | Cheyer et al. | |
| 8,799,000 B2 | 8/2014 | Guzzoni et al. | |
| 8,892,446 B2 | 11/2014 | Cheyer et al. | |
| 8,903,716 B2 | 12/2014 | Chen et al. | |
| 8,930,191 B2 | 1/2015 | Gruber et al. | |
| 8,942,986 B2 | 1/2015 | Cheyer et al. | |
| 9,117,447 B2 | 8/2015 | Gruber et al. | |
| 9,318,108 B2 | 4/2016 | Gruber et al. | |
| 9,361,084 B1 * | 6/2016 | Costa | G06F 8/61 |
| 9,548,050 B2 | 1/2017 | Gruber et al. | |
| 9,548,066 B2 | 1/2017 | Jain et al. | |
| 9,552,816 B2 | 1/2017 | VanLund et al. | |
| 9,576,576 B2 | 2/2017 | Sharifi et al. | |
| 9,640,183 B2 | 5/2017 | Jung et al. | |
| 9,666,192 B2 | 5/2017 | Fanty | |
| 9,786,279 B2 | 10/2017 | Sharifi et al. | |
| 10,074,372 B2 | 9/2018 | Jung et al. | |
| 2012/0016678 A1 | 1/2012 | Gruber et al. | |
| 2012/0245944 A1 | 9/2012 | Gruber et al. | |
| 2013/0110505 A1 | 5/2013 | Gruber et al. | |
| 2013/0110515 A1 | 5/2013 | Guzzoni et al. | |
| 2013/0110518 A1 | 5/2013 | Gruber et al. | |
| 2013/0110519 A1 | 5/2013 | Cheyer et al. | |
| 2013/0110520 A1 | 5/2013 | Cheyer et al. | |
| 2013/0111348 A1 | 5/2013 | Gruber et al. | |
| 2013/0111487 A1 | 5/2013 | Cheyer et al. | |
| 2013/0117022 A1 | 5/2013 | Chen et al. | |
| 2013/0185074 A1 | 7/2013 | Gruber et al. | |
| 2013/0185081 A1 | 7/2013 | Cheyer et al. | |
| 2014/0074466 A1 | 3/2014 | Sharifi et al. | |
| 2014/0379338 A1 * | 12/2014 | Fry | G10L 15/19 704/246 |
| 2015/0287413 A1 | 10/2015 | Jung et al. | |
| 2016/0042748 A1 * | 2/2016 | Jain | G10L 25/48 704/9 |
| 2016/0180853 A1 | 6/2016 | VanLund et al. | |
| 2016/0343371 A1 | 11/2016 | Sharifi et al. | |
| 2016/0351196 A1 | 12/2016 | Fanty | |
| 2017/0133014 A1 | 5/2017 | Sharifi et al. | |
| 2017/0178626 A1 | 6/2017 | Gruber et al. | |
| 2017/0236519 A1 | 8/2017 | Jung et al. | |
| 2018/0039478 A1 * | 2/2018 | Sung | G06F 3/167 |
| 2019/0005953 A1 * | 1/2019 | Bundalo | G10L 15/22 |
| 2019/0172465 A1 * | 6/2019 | Lee | G06F 3/167 |

* cited by examiner

VOICE PROCESSING METHOD AND ELECTRONIC DEVICE SUPPORTING THE SAME

CROSS-REFERENCE TO RELATED APPLICATION(S)

This application is based on and claims priority under 35 U.S.C. § 119 to Korean Patent Application No. 10-2017-0087373, filed on Jul. 10, 2017, in the Korean Intellectual Property Office, the disclosure of which is incorporated by reference herein its entirety.

TECHNICAL FIELD

The present disclosure relates to technologies for voice data processing, and more particularly, to voice data processing in an artificial intelligence (AI) system which uses a machine learning algorithm and an application thereof.

BACKGROUND

An AI system (or integrated intelligent system) refers to a system that trains and judges by itself and improves a recognition rate as it is used, as a computer system in which human intelligence is implemented.

AI technology may include machine learning (deep learning) technologies using an algorithm that classifies or trains characteristics of input data by themselves and element technologies that simulate functions of the human brain, for example, recognition, decision, and the like, using a machine learning algorithm.

For example, the element technologies may include at least one of, for example, a language understanding technology for recognizing languages or characters of humans, a visual understanding technology for recognizing objects like human vision, an inference/prediction technology for determines information to logically infer and predict the determined information, a knowledge expression technology for processing human experience information as knowledge data, and an operation control technology for controlling autonomous driving of vehicles and the motion of robots.

The language understanding technology among the above-mentioned element technologies includes technologies of recognizing and applying/processing human languages/characters and may include natural language processing, machine translation, dialogue system, question and answer, speech recognition/synthesis, and the like.

Recently, an AI service based on the above-mentioned AI technology may be provided in various forms. For example, after receiving an input of a user, the AI service may analyze and understand the received user input and may determine an action suitable for a request of the user, thus executing the determined action.

The above information is presented as background information only to assist with an understanding of the present disclosure. No determination has been made, and no assertion is made, as to whether any of the above might be applicable as prior art with regard to the present disclosure.

SUMMARY

A request of the user may be processed by a plurality of application programs (hereinafter referred to as "apps") installed in an electronic device. Further, a request of the user may be processed by a plurality of apps provided by an app store capable of downloading an app as well as apps installed in the electronic device. In other words, since there are a plurality of apps capable of processing a request of the user, there is a need for a method for determining a specific app to process a request of the user.

Aspects of the present disclosure are to address at least the above-mentioned problems and/or disadvantages and to provide at least the advantages described below. Accordingly, an aspect of the present disclosure is to provide a voice data processing method for supporting to determine an app to process a request of a user although an app capable of processing the request of the user is not explicitly designated through an utterance of the user and a system for supporting the same.

In accordance with an aspect of the present disclosure, an electronic device is disclosed including a network interface, at least one processor operatively connected with the network interface, and at least one memory storing instructions and operatively connected with the at least one processor to: receive a voice input through the network interface as transmitted from a first external device, the voice input including a request to execute a function using at least one application which is not indicated in the voice input, extract a first text from the voice input by executing automatic speech recognition (ASR) on the voice input, when the at least one application is identified based at least in part on the first text, transmit, through the network interface to the first external device, second data associated with the identified at least one application for display by the first external device, and when the at least one application is not identified based at least in part on the first text, reattempt identification of the at least one application by executing natural language understanding (NLU) on the first text.

In accordance with another aspect of the present disclosure, a method in an electronic device is disclosed, including receiving a voice input through a network interface as transmitted from a first external device, the voice input including a request to execute a function using at least one application which is not indicated in the voice input, extracting, by at least one processor, a first text from the voice input by executing automatic speech recognition (ASR) on the voice input, when the at least one application is identified based at least in part on the first text, transmitting, through the network interface to the first external device, second data associated with the identified at least one application for display by the first external device, and when the at least one application is not identified based at least in part on the first text, reattempting identification of the at least one application by executing natural language understanding (NLU) on the first text.

According to embodiments disclosed in the present disclosure, the electronic device may determine an app to process a request of a user by determining a capability corresponding to the request of the user and verifying an app mapped to the determined capability based on the result of analyzing voice data obtained in response to an utterance input of the user, although an app capable of processing the request of the user is not explicitly designated through an utterance of the user.

According to embodiments disclosed in the present disclosure, the method may select any one of a plurality of apps through a user preference, a history where an app is selected, a user input, or the like when there are the plurality of apps mapped to the determined capability.

In addition, various effects directly or indirectly ascertained through the present disclosure may be provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Hereinafter, various embodiments of the present disclosure may be described to be associated with accompanying drawings. Accordingly, those of ordinary skill in the art will recognize that modification, equivalent, and/or alternative on the various embodiments described herein can be variously made without departing from the present disclosure.

Before describing an embodiment of the present disclosure, a description will be given of an integrated intelligent system to which an embodiment of the present disclosure is applied.

Figure 1:
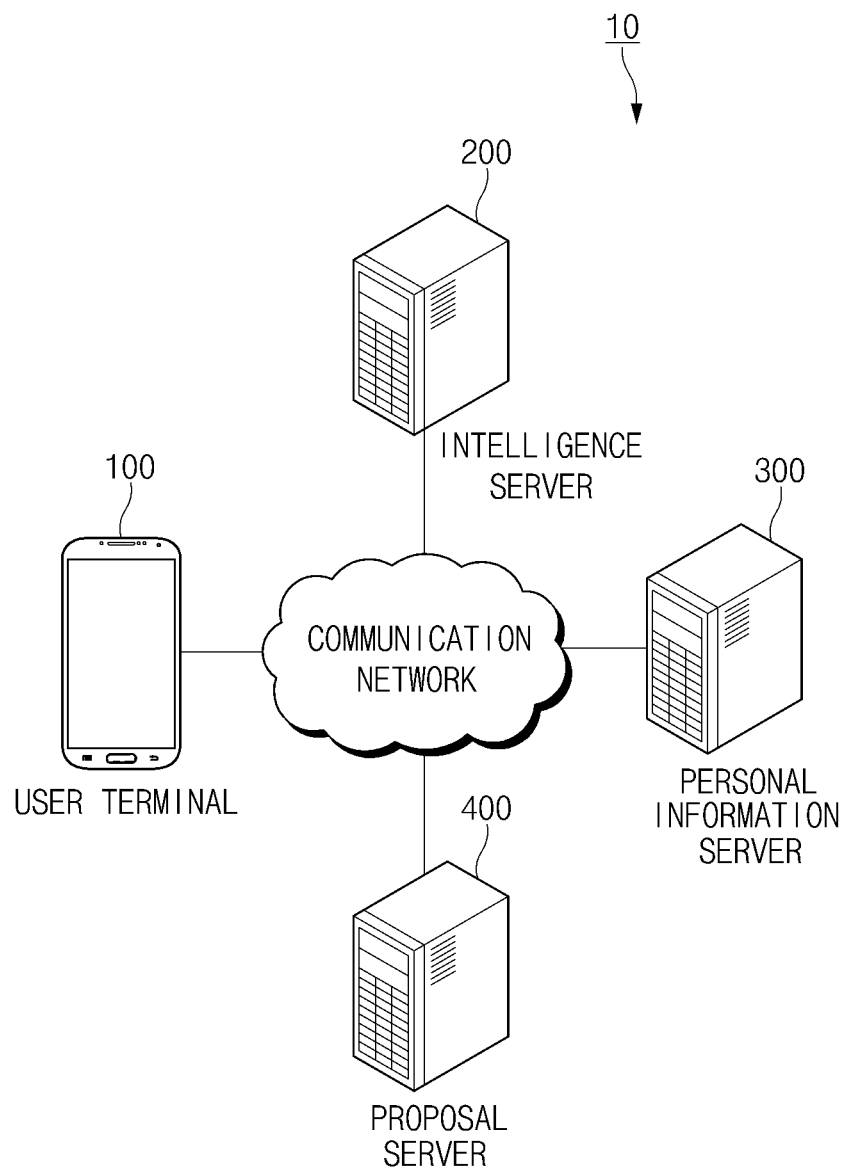
FIG. 1 is a drawing illustrating an integrated intelligent system according to various embodiments of the present disclosure.

FIG. 1 is a drawing illustrating an integrated intelligent system according to various embodiments of the present disclosure.

Referring to FIG. 1, an integrated intelligent system 10 may include a user terminal 100, an intelligence server 200, a personal information server 300, or a proposal server 400.

The user terminal 100 may provide a service utilizable for a user through an app (or an application program) (e.g., an alarm app, a message app, a photo (gallery) app, or the like) stored in the user terminal 100. For example, the user terminal 100 may execute and operate another app through an intelligence app (or a speech recognition app) stored in the user terminal 100. The user terminal 100 may receive a user input for executing the other app and executing an action through the intelligence app. The user input may be received through, for example, a physical button, a touch pad, a voice input, a remote input, or the like. According to an embodiment, the user terminal 100 may correspond to each of various terminals devices (or various electronic devices) connectable to the Internet, for example, a mobile phone, a smartphone, a personal digital assistant (PDA), or a notebook computer.

According to an embodiment, the user terminal 100 may receive an utterance of the user as a user input. The user terminal 100 may receive the utterance of the user and may generate a command to operate an app based on the utterance of the user. Thus, the user terminal 100 may operate the app using the command.

The intelligence server 200 may receive a voice input (or voice data) of the user over a communication network from the user terminal 100 and may change (or convert) the voice input to text data. In another example, the intelligence server 1200 may generate (or select) a path rule based on the text data. The path rule may include information about a sequence of states of a specific electronic device (e.g., the user terminal 100) associated with a task to be performed by the electronic device. For example, the path rule may include information about an action (or an operation) for performing a function of an app installed the electronic device or information about a parameter utilizable to execute the action. Further, the path rule may include an order of the action. The user terminal 100 may receive the path rule and may select an app depending on the path rule, thus executing an action included in the path rule in the selected app.

In general, the term "path rule" in the present disclosure may refer to, but is not limited to, a sequence of states for the electronic device to perform a task requested by the user. In other words, the path rule may include information about the sequence of the states. The task may be, for example, any action capable of being applied by an intelligence app. The task may include generating a schedule, transmitting a photo to a desired target, or providing weather information. The user terminal 100 may perform the task by sequentially having at least one or more states (e.g., an action state of the user terminal 100).

According to an embodiment, the path rule may be provided or generated by an artificial intelligence (AI) system. The AI system may be a rule-based system or may a neural network-based system (e.g., a feedforward neural network (FNN) or a recurrent neural network (RNN)). Alternatively, the AI system may be a combination of the above-mentioned systems or an AI system different from the above-mentioned systems. According to an embodiment, the path rule may be selected from a set of pre-defined path rules or may be generated in real time in response to a user request. For example, the AI system may select at least one of a plurality of pre-defined path rules or may generate a path rule on a dynamic basis (or on a real-time basis). Further, the user terminal 100 may use a hybrid system for providing a path rule.

According to an embodiment, the user terminal 100 may execute the action and may display a screen corresponding to a state of the user terminal 100 which executes the action on its display. For another example, the user terminal 100 may execute the action and may fail to display the result of performing the action on the display. For another example, the user terminal 100 may execute a plurality of actions and may display the result of performing some of the plurality of actions on the display. For example, the user terminal 100 may display the result of executing an action of the final order on the display. For another example, the user terminal 100 may receive an input of the user and may display the result of executing the action on the display.

The personal information server 300 may include a database (DB) in which user information is stored. For example, the personal information server 300 may receive user information (e.g., context information, app execution information, or the like) from the user terminal 100 and may store the received user information in the DB. The intelligence server 200 may receive the user information over the communication network from the personal information server 300 and may use the user information when generating a path rule for a user input. According to an embodiment, the user terminal 100 may receive user information over the communication network from the personal information server 300 and may use the user information as information for managing the DB.

The proposal server 400 may include a DB which stores information about a function in the user terminal 100 or a function to be introduced or provided in an application. For example, the proposal server 400 may receive user information of the user terminal 100 from the personal information server 300 and may implement a DB for a function capable of being used by the user using the user information. The user terminal 100 may receive the information about the function to be provided, over the communication network from the proposal server 400 and may provide the received information to the user.

Figure 2:
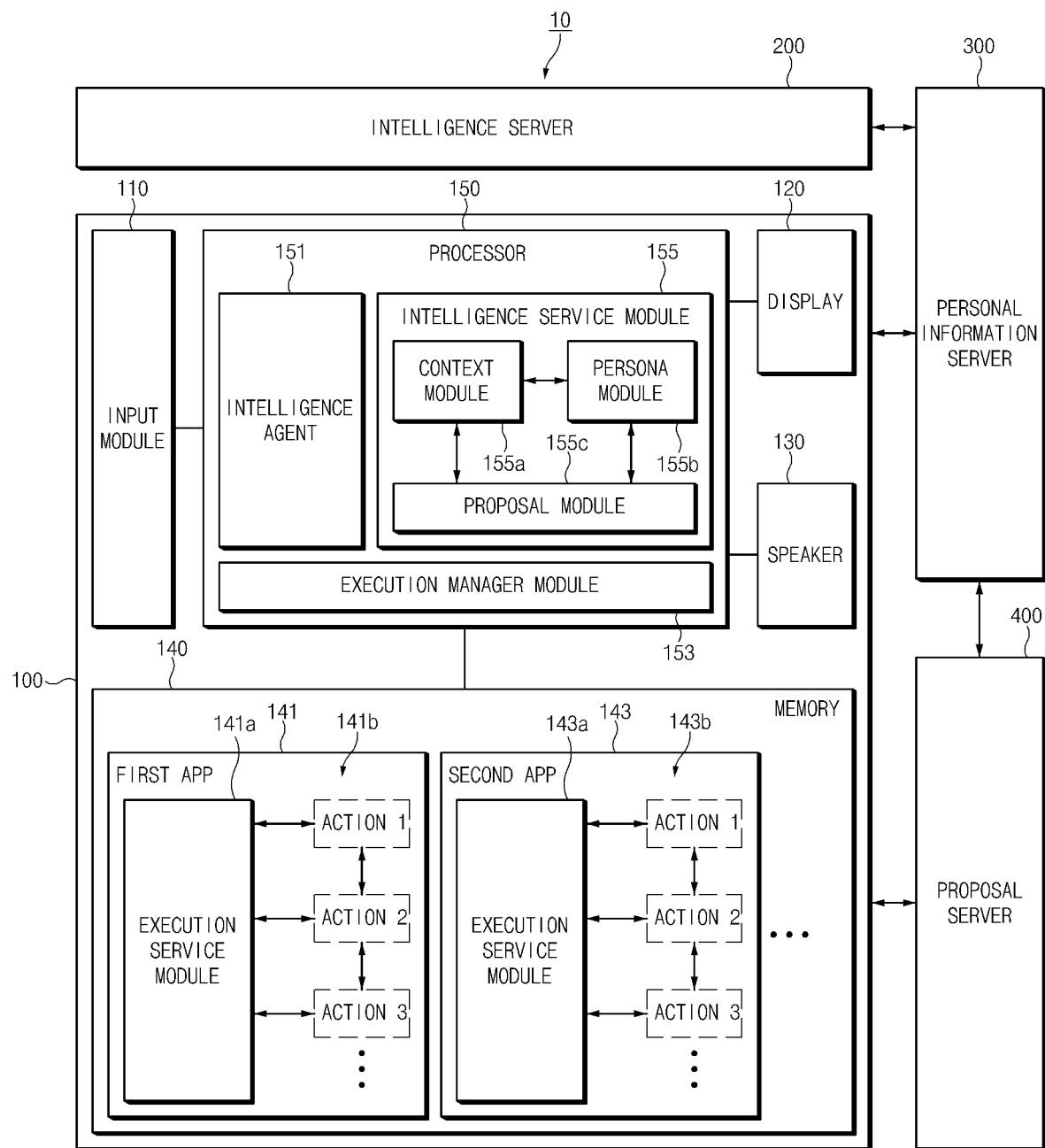
FIG. 2 is a block diagram illustrating a user terminal of an integrated intelligence system according to an embodiment of the present disclosure.

FIG. 2 is a block diagram illustrating a user terminal of an integrated intelligence system 10 according to an embodiment of the present disclosure.

Referring to FIG. 2, a user terminal 100 may include an input module 110, a display 120, a speaker 130, a memory 140, or a processor 150. The user terminal 100 may further include a housing. The elements of the user terminal 100 may be received in the housing or may be located on the housing.

The input module 110 according to an embodiment may receive a user input from a user. For example, the input module 110 may receive a user input from an external device (e.g., a keyboard or a headset) connected to the input module 110. For another example, the input module 110 may include a touch screen (e.g., a touch screen display) combined with the display 120. For another example, the input module 110 may include a hardware key (or a physical key) located in the user terminal 100 (or the housing of the user terminal 100).

According to an embodiment, the input module 110 may include a microphone (e.g., a microphone 111 of FIG. 3) capable of receiving an utterance of the user as a voice signal (or voice data). For example, the input module 110 may include a speech input system and may receive an utterance of the user as a voice signal via the speech input system.

The display 120 according to an embodiment may display an image or video and/or a screen where an application is executed. For example, the display 120 may display a graphic user interface (GUI) of an app.

According to an embodiment, the speaker 130 may output a voice signal. For example, the speaker 130 may output a voice signal generated in the user terminal 100 to the outside.

According to an embodiment, the memory 140 may store a plurality of apps (or application programs) 141 and 143. The plurality of apps 141 and 143 stored in the memory 140 may be selected, executed, and operated according to a user input.

According to an embodiment, the memory 140 may include a DB capable of storing information utilizable to recognize a user input. For example, the memory 140 may include a log DB capable of storing log information. For another example, the memory 140 may include a persona DB capable of storing user information.

According to an embodiment, the memory 140 may store the plurality of apps 141 and 143. The plurality of apps 141 and 143 may be loaded to operate. For example, the plurality of apps 141 and 143 stored in the memory 140 may be loaded by an execution manager module 153 of the processor 150 to operate. The plurality of apps 141 and 143 may respectively include execution service modules 141*a* and 143*a* for performing a function. In an embodiment, the plurality of apps 141 and 143 may execute a plurality of actions 1141*b* and 1143*b* (e.g., a sequence of states), respectively, through the execution service modules 141*a* and 143*a* to perform a function. In other words, the execution service modules 141*a* and 143*a* may be activated by the execution manager module 153 and may execute the plurality of actions 141*b* and 143*b*, respectively.

According to an embodiment, when the actions 141*b* and 143*b* of the apps 141 and 143 are executed, an execution state screen (or an execution screen) according to the execution of the actions 141*b* and 143*b* may be displayed on the display 120. The execution state screen may be, for example, a screen of a state where the actions 141*b* and 143*b* are completed. For another example, the execution state screen may be, for example, a screen of a state (partial landing) where the execution of the actions 141*b* and 143*b* is stopped (e.g., when a parameter utilizable for the actions 141*b* and 143*b* is not input).

The execution service modules 141*a* and 143*a* according to an embodiment may execute the actions 141*b* and 143*b*, respectively, depending on a path rule. For example, the execution service modules 141a and 143a may be activated by the execution manager module 153 and may execute a function of each of the apps 141 and 143 by receiving an execution request according to the path rule from the execution manager module 153 and performing the actions 141b and 143b depending on the execution request. When the performance of the actions 141b and 143b is completed, the execution service modules 141a and 143a may transmit completion information to the execution manager module 153.

According to an embodiment, when the plurality of actions 141b and 143b are respectively executed in the apps 141 and 143, the plurality of actions 141b and 143b may be sequentially executed. When execution of one action (e.g., action 1 of the first app 141 or action 1 of the second app 143) is completed, the execution service modules 141a and 143a may open a next action (e.g., action 2 of the first app 141 or action 2 of the second app 143) and may transmit completion information to the execution manager module 153. Herein, opening any action may be understood as changing the any operation to an executable state or preparing for executing the any action. In other words, when the any operation is not opened, it may fail to be executed. When the completion information is received, the execution manager module 153 may transmit a request to execute the next action (e.g., action 2 of the first app 141 or action 2 of the second app 143) to the execution service modules 141a and 143a. According to an embodiment, when the plurality of apps 141 and 143 are executed, they may be sequentially executed. When receiving completion information from the first execution service module 141a after execution of a final action (e.g., action 3) of the first app 141 is completed, the execution manager module 153 may transmit a request to execute a first action (e.g., action 1) of the second app 143 to the second execution service module 143a.

According to an embodiment, when the plurality of actions 141b and 143b are respectively executed in the apps 141 and 143, a result screen according to the execution of each of the plurality of actions 141b and 143b may be displayed on the display 120. In some embodiments, some of a plurality of result screens according to the execution of the plurality of actions 141b and 143b may be displayed on the display 120.

According to an embodiment, the memory 140 may store an intelligence app (e.g., a speech recognition app) which interworks with an intelligence agent 151. The app which interworks with the intelligence agent 151 may receive and process an utterance of the user as a voice signal (or voice data). According to an embodiment, the app which interworks with the intelligence agent 151 may be operated by a specific input (e.g., an input through a hardware key, an input through a touch screen, or a specific voice input) input through the input module 110.

According to an embodiment, the processor 150 may control an overall operation of the user terminal 100. For example, the processor 150 may control the input module 110 to receive a user input. For another example, the processor 150 may control the display 120 to display an image. For another example, the processor 150 may control the speaker 130 to output a voice signal. For another example, the processor 150 may control the memory 140 to fetch or store utilizable information.

According to an embodiment, the processor 150 may include the intelligence agent 151, the execution manager module 153, or an intelligence service module 155. In an embodiment, the processor 150 may execute instructions stored in the memory 140 to drive the intelligence agent 151, the execution manager module 153, or the intelligence service module 155. The several modules described in various embodiments of the present disclosure may be implemented in hardware or software. In various embodiments of the present disclosure, an operation performed by the intelligence agent 151, the execution manager module 153, or the intelligence service module 155 may be understood as an operation performed by the processor 150.

The intelligence agent 151 according to an embodiment may generate a command to operate an app based on a voice signal (or voice data) received as a user input. The execution manager module 153 according to an embodiment may receive the generated command from the intelligence agent 151 and may select, execute, and operate the apps 141 and 143 stored in the memory 140 based on the generated command. According to an embodiment, the intelligent service module 155 may manage user information and may use the use information to process a user input.

The intelligence agent 151 may transmit a user input received through the input module 110 to an intelligence server 200.

According to an embodiment, the intelligence agent 151 may preprocess the user input before transmitting the user input to the intelligence server 200. According to an embodiment, to preprocess the user input, the intelligence agent 151 may include an adaptive echo canceller (AEC) module, a noise suppression (NS) module, an end-point detection (EPD) module, or an automatic gain control (AGC) module. The AEC module may cancel an echo included in the user input. The NS module may suppress background noise included in the user input. The EPD module may detect an end point of a user voice included in the user input and may find a portion (e.g., a voiced band) where there is a voice of the user. The AGC module may adjust volume of the user input to be suitable for recognizing and processing the user input. According to an embodiment, the intelligence agent 151 may include all the preprocessing elements for performance. However, in another embodiment, the intelligence agent 151 may include some of the preprocessing elements to operate with a low power.

According to an embodiment, the intelligence agent 151 may include a wake-up recognition module for recognizing calling of the user. The wake-up recognition module may recognize a wake-up command (e.g., a wake-up word) of the user through a speech recognition module. When receiving the wake-up command, the wake-up recognition module may activate the intelligence agent 151 to receive a user input. According to an embodiment, the wake-up recognition module of the intelligence agent 151 may be implemented in a low-power processor (e.g., a processor included in an audio codec). According to an embodiment, the intelligence agent 151 may be activated according to a user input through a hardware key. When the intelligence agent 151 is activated, an intelligence app (e.g., a speech recognition app) which interworks with the intelligence agent 151 may be executed.

According to an embodiment, the intelligence agent 151 may include a speech recognition module for executing a user input. The speech recognition module may recognize a user input for executing an action in an app. For example, the speech recognition module may recognize a limited user (voice) input for executing an action such as the wake-up command (e.g., utterance like "a click" for executing an image capture operation while a camera app is executed). The voice recognition module which helps the intelligence server 200 with recognizing a user input may recognize and quickly process, for example, a user command capable of being processed in the user terminal 100. According to an embodiment, the speech recognition module for executing the user input of the intelligence agent 1151 may be implemented in an app processor.

According to an embodiment, the speech recognition module (including a speech recognition module of the wake-up recognition module) in the intelligence agent 151 may recognize a user input using an algorithm for recognizing a voice. The algorithm used to recognize the voice may be at least one of, for example, a hidden Markov model (HMM) algorithm, an artificial neural network (ANN) algorithm, or a dynamic time warping (DTW) algorithm.

According to an embodiment, the intelligence agent 151 may convert a voice input (or voice data) of the user into text data. According to an embodiment, the intelligence agent 151 may transmit a voice of the user to the intelligence server 200, and the intelligence server 200 may convert the voice of the user into text data. The intelligence agent 151 may receive the converted text data. Thus, the intelligence agent 151 may display the text data on the display 120.

According to an embodiment, the intelligence agent 151 may receive a path rule transmitted from the intelligence server 200. According to an embodiment, the intelligence agent 151 may transmit the path rule to the execution manager module 153.

According to an embodiment, the intelligence agent 151 may transmit an execution result log according to the path rule received from the intelligence server 200 to an intelligence service module 155. The transmitted execution result log may be accumulated and managed in preference information of the user of a persona module (or a persona manager) 1155*b*.

The execution manager module 153 according to an embodiment may receive a path rule from the intelligence agent 151 and may execute the apps 141 and 143 depending on the path such that the apps 141 and 143 respectively execute the actions 141*b* and 143*b* included in the path rule. For example, the execution manager module 153 may transmit command information (e.g., path rule information) for executing the actions 141*b* and 143*b* to the apps 141 and 143 and may receive completion information of the actions 141*b* and 143*b* from the apps 141 and 143.

According to an embodiment, the execution manager module 153 may transmit and receive command information (e.g., path rule information) for executing the actions 141*b* and 143*b* of the apps 141 and 143 between the intelligence agent 151 and the apps 141 and 143. The execution manager module 153 may bind the apps 141 and 143 to be executed according to the path rule and may transmit command information (e.g., path rule information) of the actions 141*b* and 143*b* included in the path rule to the apps 141 and 143. For example, the execution manager module 153 may sequentially transmit the actions 141*b* and 143*b* included in the path rule to the apps 141 and 143 and may sequentially execute the actions 141*b* and 143*b* of the apps 141 and 143 depending on the path rule.

According to an embodiment, the execution manager module 153 may manage a state where the actions 141*b* and 143*b* of the apps 141 and 143 are executed. For example, the execution manager module 153 may receive information about a state where the actions 141*b* and 143*b* are executed from the apps 141 and 143. For example, when a state where the actions 141*b* and 143*b* are executed is a stopped state (partial landing) (e.g., when a parameter utilizable for the actions 141*b* and 143*b* is not input), the execution manager module 153 may transmit information about the state (partial landing) to the intelligence agent 151. The intelligence agent 151 may request to input information (e.g., parameter information) utilizable for the user, using the received information. For another example, when the state where the actions 141*b* and 143*b* are executed is an action state, the execution manager module 153 may receive utterance from the user and may transmit the executed apps 141 and 143 and information about a state where the apps 141 and 143 are executed to the intelligence agent 151. The intelligence agent 151 may receive parameter information of an utterance of the user through the intelligence server 200 and may transmit the received parameter information to the execution manager module 153. The execution manager module 153 may change a parameter of each of the actions 141*b* and 143*b* to a new parameter using the received parameter information.

According to an embodiment, the execution manager module 153 may transmit parameter information included in the path rule to the apps 141 and 143. When the plurality of apps 141 and 143 are sequentially executed according to the path rule, the execution manager module 153 may transmit the parameter information included in the path rule from one app to another app.

According to an embodiment, the execution manager module 153 may receive a plurality of path rules. The execution manager module 153 may receive the plurality of path rules based on an utterance of the user. For example, when an utterance of the user specifies the first app 141 to execute some actions (e.g., the action 1141*b*), but when it does not specify the other second app 143 to execute the other actions (e.g., the action 143*b*), the execution manager module 153 may receive a plurality of different path rules capable of executing the first app 141 (e.g., a gallery app) and the plurality of different apps 143 (e.g., a message app and a telegram app). In other words, the execution manager module 153 may receive a first path rule in which the first app 141 (e.g., the gallery app) to execute the some actions (e.g., the action 141*b*) is executed and in which any one (e.g., the message app) of the second apps 143 capable of executing the other actions (e.g., the action 143*b*) is executed and a second path rule in which the first app 141 (e.g., the gallery app) to execute the some actions (e.g., the action 141*b*) is executed and in which the other (e.g., the telegram app) of the second apps 143 capable of executing the other actions (e.g., the action 143*b*) is executed.

According to an embodiment, the execution manager module 153 may execute the same actions 141*b* and 143*b* (e.g., the consecutive same actions 141*b* and 143*b*) included in the plurality of path rules. When the same actions are executed, the execution manager module 153 may display a state screen capable of selecting the different apps 141 and 143 included in the plurality of path rules on the display 120.

According to an embodiment, the intelligence service module 155 may include a context module 155*a*, a persona module 155*b*, or a proposal module 155*c*.

The context module 155*a* may collect a current state of each of the apps 141 and 143 from the apps 141 and 143. For example, the context module 155*a* may receive context information indicating the current state of each of the apps 141 and 143 and may collect the current state of each of the apps 141 and 143.

The persona module 155*b* may manage personal information of the user who uses the user terminal 100. For example, the persona module 155*b* may collect information (or usage history information) about the use of the user terminal 100 and the result of performing the user terminal 100 and may manage the personal information of the user.

The proposal module 155c may predict an intent of the user and may recommend a command to the user. For example, the proposal module 155c may recommend the command to the user in consideration of a current state (e.g., time, a place, a situation, or an app) of the user.

Figure 3:
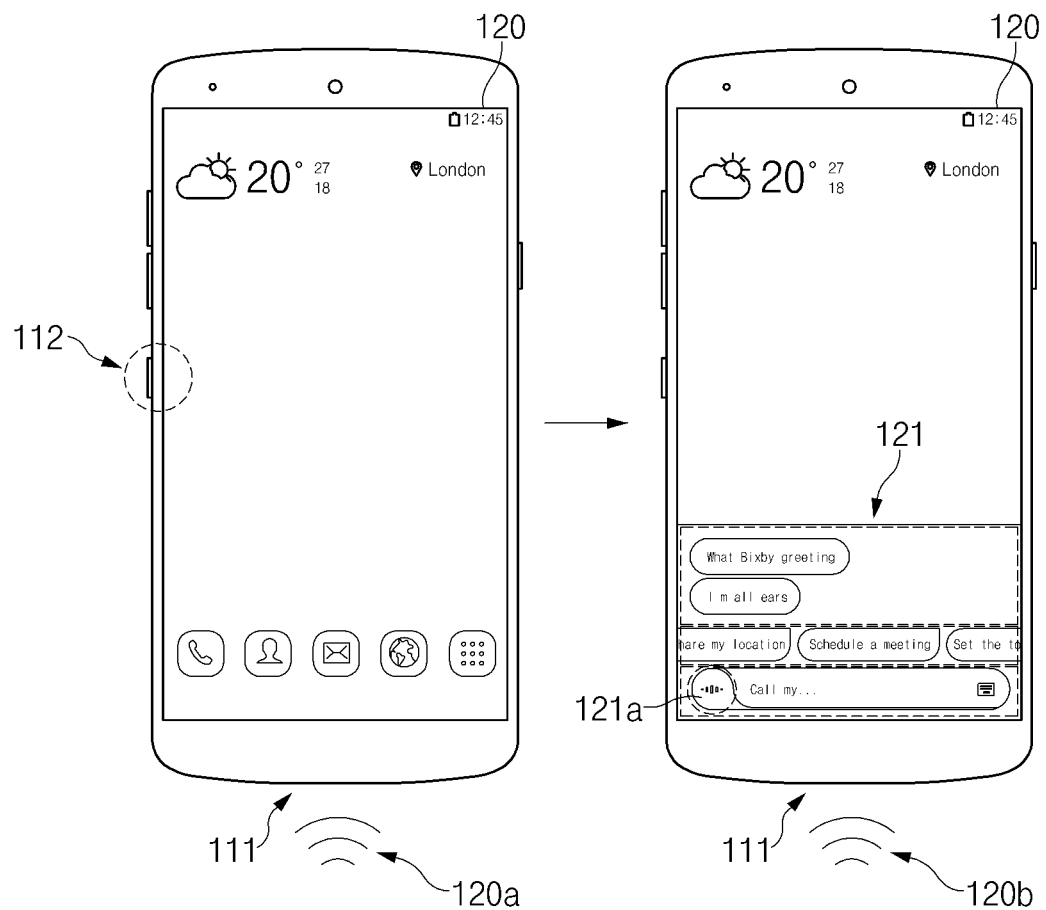
FIG. 3 is a drawing illustrating a method for executing an intelligence app of a user terminal according to an embodiment of the prevent disclosure.

FIG. 3 is a drawing illustrating a method for executing an intelligence app of a user terminal according to an embodiment of the prevent disclosure.

Referring to FIG. 3, a user terminal 100 of FIG. 2 may receive a user input and may execute an intelligence app (e.g., a speech recognition app) which interworks with an intelligence agent 151 of FIG. 2.

According to an embodiment, the user terminal 100 may execute an intelligence app for recognizing a voice through a hardware key 112. For example, when receiving a user input through the hardware key 112, the user terminal 100 may display a user interface (UI) 121 of the intelligence app on a display 120. In this case, a user may touch a speech recognition button 121a displayed within the UI 121 of the intelligence app to input (120b) a voice while the user terminal 100 operates within a state in which the UI 121 of the intelligence app is displayed on the display 120. For another example, the user may input (120b) a voice while maintaining selection of or depression of the hardware key 112.

According to an embodiment, the user terminal 100 may execute an intelligence app for recognizing a voice input received through a microphone 111. For example, when a specified voice (or a wake-up command) (e.g., "wake up!") is received (120a) through the microphone 111, the user terminal 100 may responsively display the UI 121 of the intelligence app on the display 120.

Figure 4:
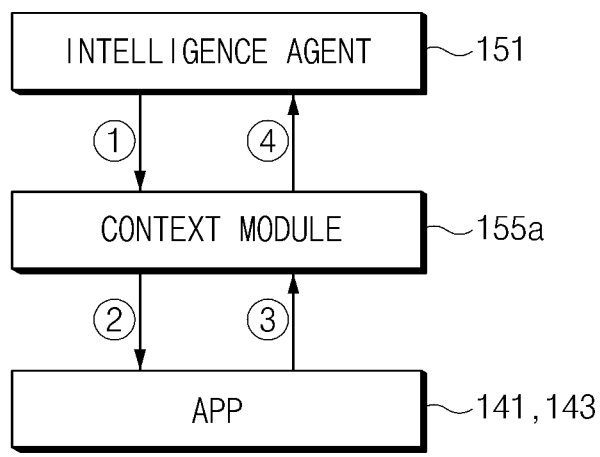
FIG. 4 is a drawing illustrating a method for collecting a current state at a context module of an intelligence service module according to an embodiment of the present disclosure.

FIG. 4 is a drawing illustrating a method for collecting a current state at a context module of an intelligence service module according to an embodiment of the present disclosure.

Referring to FIG. 4, when receiving (0) a context request from an intelligence agent 151 requesting information indicating a current state of one or more applications executing on the portable terminal, a context module 155a may request (①) the apps 141 and 143 to provide context information indicating a current state of each of the apps 141 and 143. According to an embodiment, the context module 155a may receive (③) the context information from each of the apps 141 and 143 and may transmit (④) the received context information to the intelligence agent 151.

According to an embodiment, the context module 155a may receive a plurality of context information through the apps 141 and 143. For example, the context information may be information about the latest executed apps 141 and 143. For another example, the context information may be information about a current state in the apps 141 and 143 (e.g., information about a photo when a user views the photo in a gallery).

According to an embodiment, the context module 155a may receive context information indicating a current state of a user terminal 100 of FIG. 2 from a device platform as well as the apps 141 and 143. The context information may include general context information, user context information, or device context information.

The general context information may include general information of the user terminal 100. The general context information may be verified through an internal algorithm by data received via a sensor hub or the like of the device platform. For example, the general context information may include information about a current space-time. The information about the current space-time may include, for example, a current time or information about a current location of the user terminal 100. The current time may be verified through a time on the user terminal 100. The information about the current location may be verified through a global positioning system (GPS). For another example, the general context information may include information about physical motion. The information about the physical motion may include, for example, information about walking, running, or driving. The information about the physical motion may be verified through a motion sensor. The information about the driving may be used to verify a vehicle drive through the motion sensor and verify that a user rides in a vehicle and parks the vehicle by detecting a Bluetooth connection in the vehicle. For another example, the general context information may include user activity information. The user activity information may include information about, for example, commute, shopping, a trip, or the like. The user activity information may be verified using information about a place registered in a DB by a user or an app.

The user context information may include information about the user. For example, the user context information may include information about an emotional state of the user. The information about the emotional state may include information about, for example, happiness, sadness, anger, or the like of the user. For another example, the user context information may include information about a current state of the user. The information about the current state may include information about, for example, interest, intent, or the like (e.g., shopping).

The device context information may include information about a state of the user terminal 100. For example, the device context information may include information about a path rule executed by an execution manager module 153 of FIG. 2. For another example, the device context information may include information about a battery. The information about the battery may be verified through, for example, a charging and discharging state of the battery. For another example, the device context information may include information about a connected device and network. The information about the connected device may be verified through, for example, a communication interface to which the device is connected.

Figure 5:
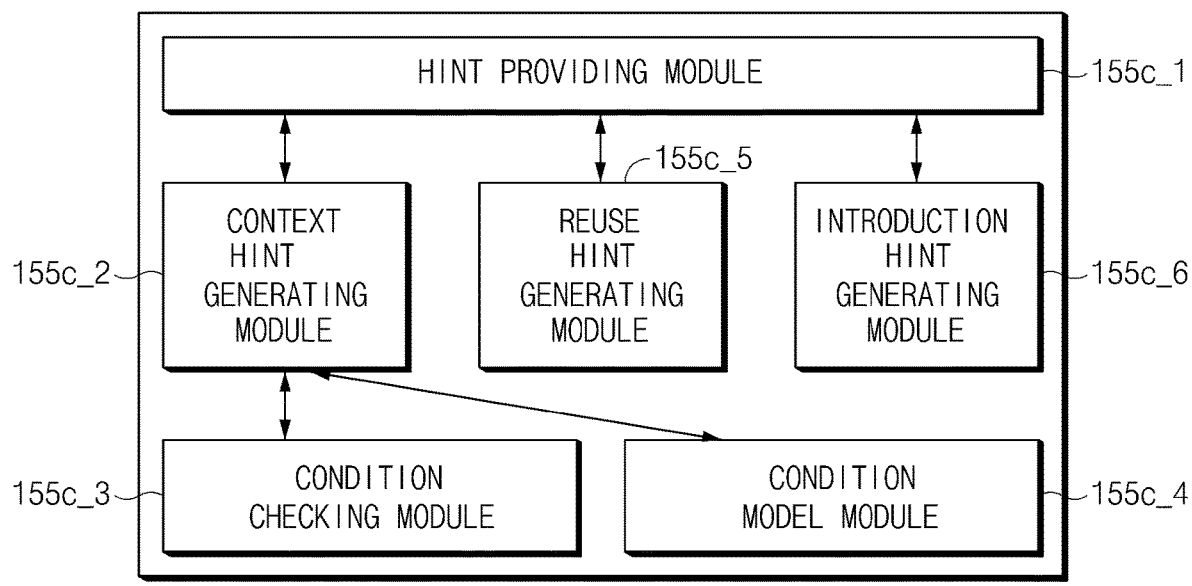
FIG. 5 is a block diagram illustrating a proposal module of an intelligence service module according to an embodiment of the present disclosure.

FIG. 5 is a block diagram illustrating a proposal module of an intelligence service module according to an embodiment of the present disclosure.

Referring to FIG. 5, a proposal module 155c may include a hint providing module 155c_1, a context hint generating module 155c_2, a condition checking module 155c_3, a condition model module 155c_4, and a reuse hint generating module 155c_5, or an introduction hint generating module 155c_6. A "hint" may be an instructional generated and provided in one or more media formats including display elements, visualizations, audio cues or other such instructions, which may aid a user in the operation of one or more functions of the portable terminal.

According to an embodiment, the hint providing module 155c_1 may provide a hint to a user. For example, the hint providing module 155c_1 may receive a hint generated from the context hint generating module 155c_2, the reuse hint generating module 155c_5, or the introduction hint generating module 155c_6 and may provide (or otherwise cause output of) the hint to the user.

According to an embodiment, the context hint generating module 155c_2 may generate a hint contextually operable and appropriate to a current state through the condition checking module 155c_3 or the condition model module 155*c*_4. The condition checking module 155*c*_3 may receive information corresponding to a current state of the portable terminal and/or a function thereof through an intelligence service module 155 of FIG. 2. The condition model module 155*c*_4 may set a condition model using the received information. For example, the condition model module 155*c*_4 may determine a time when a hint is to be provided to the user, a physical location where the hint to be is provided to the user, an environmental situation where the hint is to be provided to the user, an app which should be in use when the hint is to be provided to the user and the like, and may provide the hint such that there is a high possibility of beneficial utilization in a corresponding operating condition to the user, according to a predetermined order of priority. According to an embodiment, the reuse hint generating module 155*c*_5 may generate a hint capable of being recommended in consideration of a frequency of use depending on a current state. For example, the reuse hint generating module 155*c*_5 may generate the hint in consideration of a usage pattern of the user.

According to an embodiment, the introduction hint generating module 155*c*_6 may generate a hint of introducing a new function or a function frequently used by another user to the user. For example, the hint of introducing the new function may include introduction (e.g., an operation method) of an intelligence agent 151 of FIG. 2.

According to another embodiment, the context hint generating module 155*c*_2, the condition checking module 155*c*_3, the condition model module 155*c*_4, the reuse hint generating module 155*c*_5, or the introduction hint generating module 155*c*_6 of the proposal module 155*c* may be included in a personal information server 300 of FIG. 2. For example, the hint providing module 155*c*_1 of the proposal module 155*c* may receive a hint from the context hint generating module 155*c*_2, the reuse hint generating module 155*c*_5, or the introduction hint generating module 155*c*_6 of the personal information server 300 and may provide the received hint to the user.

According to an embodiment, a user terminal 100 of FIG. 2 may provide a hint depending on the following series of processes. For example, when receiving (①) a hint providing request from the intelligence agent 151, the hint providing module 155*c*_1 may transmit (②) the hint generation request to the context hint generating module 155*c*_2. When receiving the hint generation request, the context hint generating module 155*c*_2 may receive (④) information corresponding to a current state from a context module 155*a* and a persona module 155*b* of FIG. 2 using (③) the condition checking module 155*c*_3. The condition checking module 155*c*_3 may transmit (⑤) the received information to the condition model module 155*c*_4. The condition model module 155*c*_4 may assign a priority to a hint with a high possibility of being used in the condition among hints provided to the user using the information. The context hint generating module 155*c*_2 may verify (⑥) the condition and may generate a hint corresponding to the current state. The context hint generating module 155*c*_2 may transmit (⑦) the generated hint to the hint providing module 155*c*_1. The hint providing module 155*c*_1 may arrange the hint depending on a specified rule and may transmit (⑧) the hint to the intelligence agent 151.

According to an embodiment, the hint providing module 155*c*_1 may generate a plurality of context hints and may prioritize the plurality of context hints depending on a specified rule. According to an embodiment, the hint providing module 155*c*_1 may first provide a hint with a higher priority among the plurality of context hints to the user.

According to an embodiment, the user terminal 100 may propose a hint according to a frequency of use. For example, when receiving (①) a hint providing request from the intelligence agent 151, the hint providing module 155*c*_1 may transmit (②) a hint generation request to the reuse hint generating module 155*c*_5. When receiving the hint generation request, the reuse hint generating module 155*c*_5 may receive (③) user information from the persona module 155*b*. For example, the reuse hint generating module 155*c*_5 may receive a path rule included in preference information of the user of the persona module 155*b*, a parameter included in the path rule, a frequency of execution of an app, and space-time information used by the app. The reuse hint generating module 155*c*_5 may generate a hint corresponding to the received user information. The reuse hint generating module 155*c*_5 may transmit (④) the generated hint to the hint providing module 155*c*_1. The hint providing module 155*c*_1 may arrange the hint and may transmit (⑤) the hint to the intelligence agent 151.

According to an embodiment, the user terminal 100 may propose a hint for a new function. For example, when receiving (①) a hint providing request from the intelligence agent 151, hint providing module 155*c*_1 may transmit (②) a hint generation request to the introduction hint generating module 155*c*_6. The introduction hint generating module 155*c*_6 may transmit (③) an introduction hint providing request to a proposal server 400 of FIG. 2 and may receive (④) information about a function to be introduced from the proposal server 400. For example, the proposal server 400 may store information about a function to be introduced. A hint list of the function to be introduced may be updated by a service operator. The introduction hint generating module 155*c*_6 may transmit (⑤) the generated hint to the hint providing module 155*c*1. The hint providing module 155*c*_1 may arrange the hint and may transmit (⑥) the hint to the intelligence agent 151.

Thus, the proposal module 155*c* may provide the hint generated by the context hint generating module 155*c*_2, the reuse hint generating module 155*c*_5, or the introduction hint generating module 155*c*_6 to the user. For example, the proposal module 155*c* may display the generated hint on an app of operating the intelligence agent 151 and may receive an input for selecting the hint from the user through the app.

Figure 6:
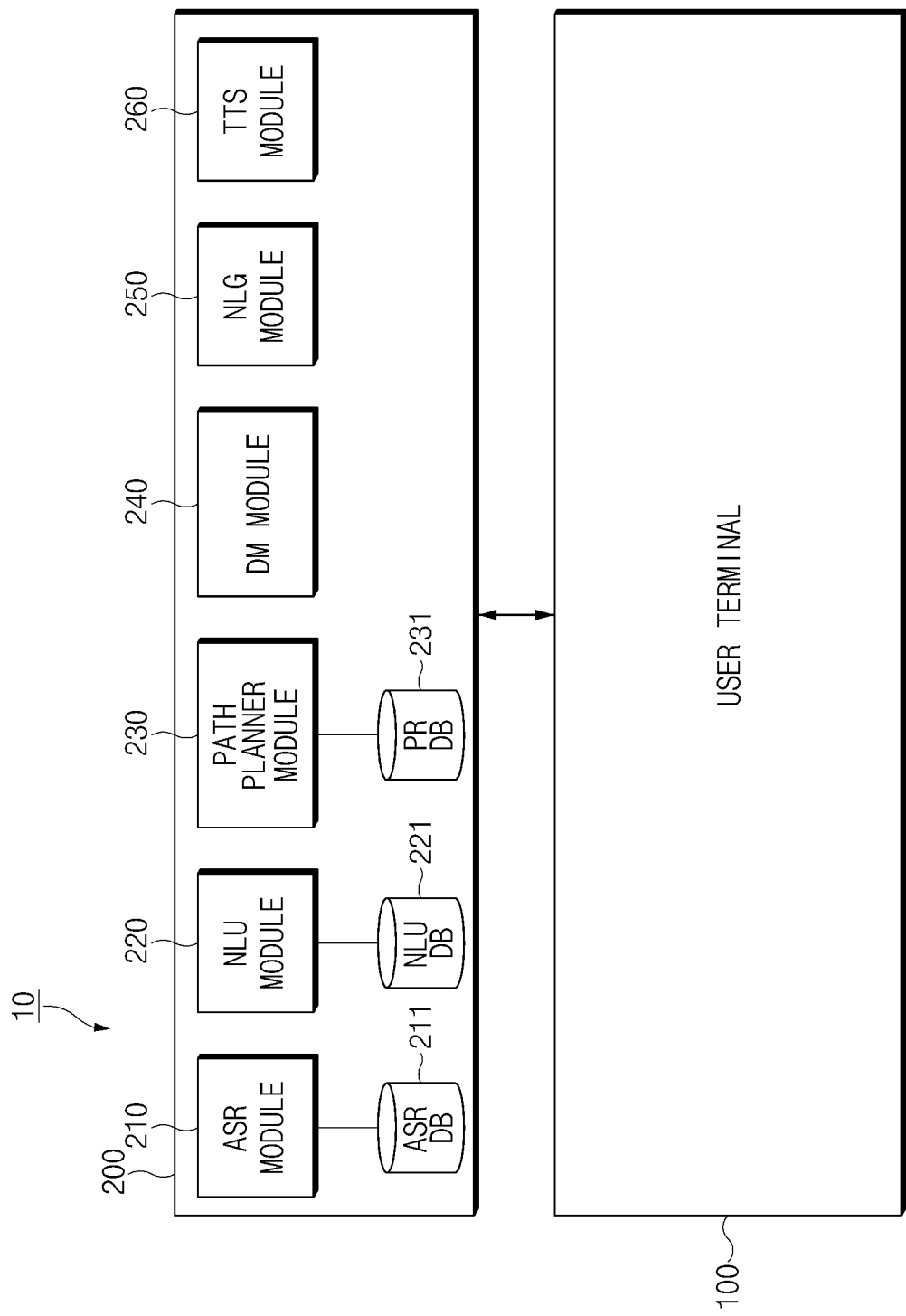
FIG. 6 is a block diagram illustrating an intelligence server of an integrated intelligent system according to an embodiment of the present disclosure.

FIG. 6 is a block diagram illustrating an intelligence server of an integrated intelligent system 10 according to an embodiment of the present disclosure.

Referring to FIG. 6, an intelligence server 200 may include an automatic speech recognition (ASR) module 210, a natural language understanding (NLU) module 220, a path planner module 230, a dialogue manager (DM) module 240, a natural language generator (NLG) module 250, or a text to speech (TTS) module 260.

The NLU module 220 or the path planner module 230 of the intelligence server 200 may generate a path rule.

According to an embodiment, the ASR module 210 may convert a user input (e.g., voice data) received from a user terminal 100 into text data. For example, the ASR module 210 may include an utterance recognition module. The utterance recognition module may include an acoustic model and a language model. For example, the acoustic model may include information associated with vocalization, and the language model may include unit phoneme information and information about a combination of unit phoneme information. The utterance recognition module may convert a user utterance (or voice data) into text data using the information associated with vocalization and information associated with a unit phoneme. For example, the information about the acoustic model and the language model may be stored in an ASR DB 211.

According to an embodiment, the NLU module 220 may perform a syntactic analysis or a semantic analysis to determine an intent of a user. The syntactic analysis may be used to divide a user input into a syntactic unit (e.g., a word, a phrase, a morpheme, or the like) and determine whether the divided unit has any syntactic element. The semantic analysis may be performed using semantic matching, rule matching, formula matching, or the like. Thus, the NLU module 220 may obtain a domain, intent, or a parameter (or a slot) utilizable to express the intent from a user input through the above-mentioned analysis.

According to an embodiment, the NLU module 220 may determine the intent of the user and a parameter using a matching rule which is divided into a domain, intent, and a parameter (or a slot). For example, one domain (e.g., an alarm) may include a plurality of intents (e.g., an alarm setting, alarm release, and the like), and one intent may need a plurality of parameters (e.g., a time, the number of iterations, an alarm sound, and the like). The plurality of rules may include, for example, one or more utilizable parameters. The matching rule may be stored in a NLU DB 221.

According to an embodiment, the NLU module 220 may determine a meaning of a word extracted from a user input using a linguistic feature (e.g., a syntactic element) such as a morpheme or a phrase and may match the determined meaning of the word to the domain and intent to determine the intent of the user. For example, the NLU module 220 may calculate how many words extracted from a user input are included in each of the domain and the intent, thus determining the intent of the user. According to an embodiment, the NLU module 220 may determine a parameter of the user input using a word which is the basis for determining the intent. According to an embodiment, the NLU module 220 may determine the intent of the user using the NLU DB 221 which stores the linguistic feature for determining the intent of the user input. According to another embodiment, the NLU module 220 may determine the intent of the user using a personal language model (PLM). For example, the NLU module 220 may determine the intent of the user using personalized information (e.g., a contact list or a music list). For example, the PLM may be stored in, for example, the NLU DB 221. According to an embodiment, the ASR module 210 as well as the NLU module 220 may recognize a voice of the user with reference to the PLM stored in the NLU DB 221.

According to an embodiment, the NLU module 220 may generate a path rule based on an intent of a user input and a parameter. For example, the NLU module 220 may select an app to be executed, based on the intent of the user input and may determine an action to be executed in the selected app. The NLU module 220 may determine a parameter corresponding to the determined action to generate the path rule. According to an embodiment, the path rule generated by the NLU module 220 may include information about an app to be executed, an action (e.g., at least one or more states) to be executed in the app, and a parameter utilizable to execute the action.

According to an embodiment, the NLU module 220 may generate one path rule or a plurality of path rules based on the intent of the user input and the parameter. For example, the NLU module 220 may receive a path rule set corresponding to a user terminal 100 from the path planner module 230 and may map the intent of the user input and the parameter to the received path rule set to determine the path rule.

According to another embodiment, the NLU module 220 may determine an app to be executed, an action to be executed in the app, and a parameter utilizable to execute the action, based on the intent of the user input and the parameter to generate one path rule or a plurality of path rules. For example, the NLU module 220 may arrange the app to be executed and the action to be executed in the app in the form of ontology or a graph model depending on the intent of the user input using information of the user terminal 100 to generate the path rule. The generated path rule may be stored in, for example, a path rule database (PR DB) 231 through the path planner module 230. The generated path rule may be added to a path rule set stored in the PR DB 231.

According to an embodiment, the NLU module 220 may select at least one of a plurality of generated path rules. For example, the NLU module 220 may select an optimal path rule among the plurality of path rules. For another example, when some actions are specified based on a user utterance, the NLU module 220 may select a plurality of path rules. The NLU module 220 may determine one of the plurality of path rules depending on an additional input of the user.

According to an embodiment, the NLU module 220 may transmit the path rule to the user terminal 100 in response to a request for a user input. For example, the NLU module 220 may transmit one path rule corresponding to the user input to the user terminal 100. For another example, the NLU module 220 may transmit the plurality of path rules corresponding to the user input to the user terminal 100. For example, when some actions are specified based on a user utterance, the plurality of path rules may be generated by the NLU module 220.

According to an embodiment, the path planner module 230 may select at least one of the plurality of path rules.

According to an embodiment, the path planner module 230 may transmit a path rule set including the plurality of path rules to the NLU module 220. The plurality of path rules included in the path rule set may be stored in the PR DB 231 connected to the path planner module 230 in the form of a table. For example, the path planner module 230 may transmit a path rule set corresponding to information (e.g., Operating System (OS) information, app information, or the like) of the user terminal 100, received from an intelligence agent 151 of FIG. 2, to the NLU module 220. A table stored in the PR DB 231 may be stored for, for example, each domain or each version of the domain.

According to an embodiment, the path planner module 230 may select one path rule or a plurality of path rules from a path rule set to transmit the selected one path rule or the plurality of selected path rules to the NLU module 220. For example, the path planner module 230 may match an intent of the user and a parameter to a path rule set corresponding to the user terminal 100 to select one path rule or a plurality of path rules and may transmit the selected one path rule or the plurality of selected path rules to the NLU module 220.

According to an embodiment, the path planner module 230 may generate one path rule or a plurality of path rules using the intent of the user and the parameter. For example, the path planner module 230 may determine an app to be executed and an action to be executed in the app, based on the intent of the user and the parameter to generate the one path rule or the plurality of path rules. According to an embodiment, the path planner module 230 may store the generated path rule in the PR DB 231.

According to an embodiment, the path planner module 230 may store a path rule generated by the NLU module 220 in the PR DB 231. The generated path rule may be added to a path rule set stored in the PR DB 231.

According to an embodiment, the table stored in the PR DB 231 may include a plurality of path rules or a plurality of path rule sets. The plurality of path rules or the plurality of path rule sets may reflect a kind, version, type, or characteristic of a device which performs each path rule.

According to an embodiment, the DM module 240 may determine whether the intent of the user, determined by the NLU module 220, is clear. For example, the DM module 240 may determine whether the intent of the user is clear, based on whether information of a parameter is sufficient. The DM module 240 may determine whether the parameter determined by the NLU module 220 is sufficient to perform a task. According to an embodiment, when the intent of the user is not clear, the DM module 240 may perform feedback for requesting information utilizable for the user. For example, the DM module 240 may perform feedback for requesting information about a parameter for determining the intent of the user.

According to an embodiment, the DM module 240 may include a content provider module. When the content provider module performs an action based on the intent and the parameter determined by the NLU module 220, it may generate the result of performing a task corresponding to a user input. According to an embodiment, the DM module 240 may transmit the result generated by the content provider module as a response to the user input to the user terminal 100.

According to an embodiment, the NLG module 250 may change specified information in the form of text. Information changed to the text form may be a form of a natural language utterance. The information changed in the form of text may have a form of a natural language utterance. The specified information may be, for example, information about an additional input, information for providing a notification that an action corresponding to a user input is completed, or information for providing a notification of the additional input of the user (e.g., information about feedback on the user input). The information changed in the form of text may be transmitted to the user terminal 100 to be displayed on a display 120 FIG. 2 or may be transmitted to the TTS module 260 to be changed in the form of a voice.

According to an embodiment, the TTS module 260 may change information of a text form to information of a voice form. The TTS module 260 may receive the information of the text form from the NLG module 250 and may change the information of the text form to the information of the voice form, thus transmitting the information of the voice form to the user terminal 100. The user terminal 100 may output the information of the voice form through a speaker 130 of FIG. 2.

According to an embodiment, the NLU module 220, the path planner module 230, and the DM module 240 may be implemented as one module. For example, the NLU module 220, the path planner module 230 and the DM module 240 may be implemented as the one module to determine an intent of the user and a parameter and generate a response (e.g., a path rule) corresponding to the determined intent of the user and the determined parameter. Thus, the generated response may be transmitted to the user terminal 100.

Figure 7:
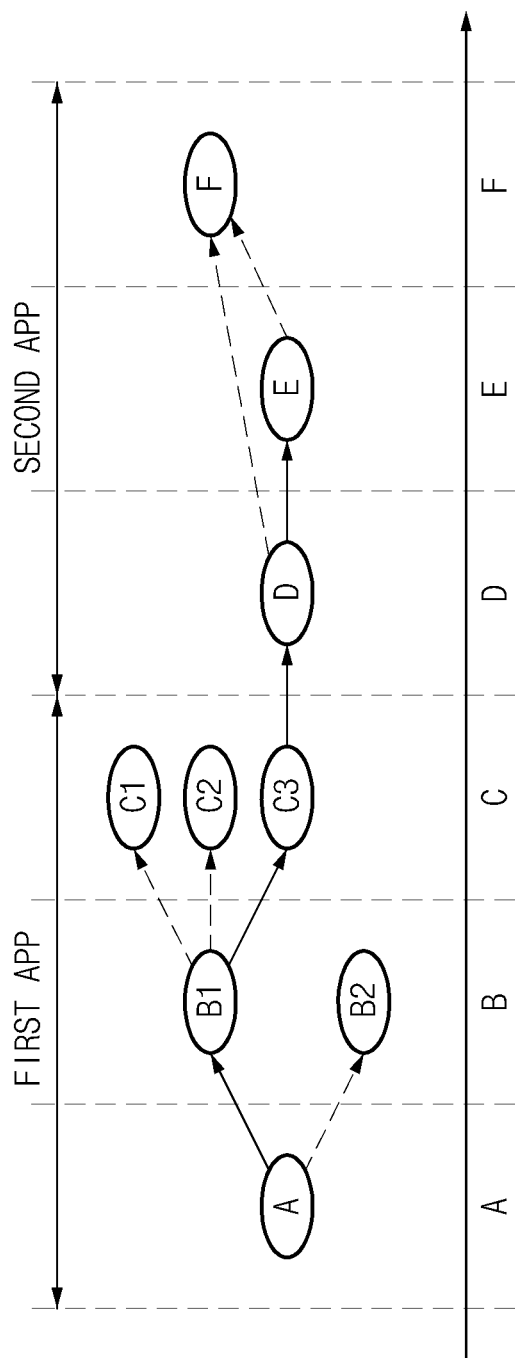
FIG. 7 is a drawing illustrating a method for generating a path rule at a path planner module according to an embodiment of the present disclosure.

FIG. 7 is a drawing illustrating a method for generating a path rule at a path planner module according to an embodiment of the present disclosure.

Referring to FIG. 7, according to an embodiment, an NLU module 220 of FIG. 6 may classify a function of an app into any one of actions (e.g., state A to state F) and may store the divided actions in a PR DB 231, as seen in FIG. 6. For example, the NLU module 220 may store a path rule set, including a plurality of path rules (e.g., a first path rule A-B1-C1, a second path rule A-B1-C2, a third path rule A-B1-C3-D-F, and a fourth path rule A-B1-C3-D-E-F, etc.) classified as one action (e.g., state), in the PR DB 231.

According to an embodiment, the PR DB 231 of a path planner module 230 of FIG. 6 may store a path rule set for performing the function of the app. The path rule set may include a plurality of path rules, each of which includes a plurality of actions (e.g., a sequence of states). An action executed depending on a parameter input to each of the plurality of actions may be sequentially arranged in the plurality of path rules. According to an embodiment, the plurality of path rules may be configured in the form of ontology or a graph model which is to be stored in the PR DB 231.

According to an embodiment, the NLU module 220 may select an optimal path rule (e.g., the third path rule A-B1-C3-D-F may be indicated as optimal) among the plurality of path rules (e.g., the first path rule A-B1-C1, the second path rule A-B1-C2, the third path rule A-B1-C3-D-F, and the fourth path rule A-B1-C3-D-E-F) corresponding to an intent of a user input and a parameter.

According to an embodiment, when there is no path rule completely matched to a user input, the NLU module 220 may transmit a plurality of rules to a user terminal 100 of FIG. 6. For example, the NLU module 220 may select a path rule (e.g., a fifth path rule A-B1) partially corresponding to the user input. The NLU module 220 may select one or more path rules (e.g., the first path rule A-B1-C1, the second path rule A-B1-C2, the third path rule A-B1-C3-D-F, and the fourth path rule A-B1-C3-D-E-F) including the path rule (e.g., the fifth path rule A-B1) partially corresponding to the user input and may transmit the one or more path rules to the user terminal 100.

According to an embodiment, the NLU module 220 may select one of a plurality of path rules based on an additional input of the user terminal 100 and may transmit the selected one path rule to the user terminal 100. For example, the NLU module 220 may select one (e.g., the third path rule A-B1-C3-D-F) of the plurality of path rules (e.g., the first path rule A-B1-C1, the second path rule A-B1-C2, the third path rule A-B1-C3-D-F, and the fourth path rule A-B1-C3-D-E-F) depending on a user input (e.g., an input for selecting C3) additionally input to the user terminal 100, thus transmitting the selected one path rule to the user terminal 100.

According to another embodiment, the NLU module 220 may determine an intent of the user and a parameter corresponding to the user input (e.g., the input for selecting C3) additionally input to the user terminal 100, thus transmitting the determined intent of the user or the determined parameter to the user terminal 100. The user terminal 100 may select one (e.g., the third path rule A-B1-C3-D-F) of the plurality of path rules (e.g., the first path rule A-B1-C1, the second path rule A-B1-C2, the third path rule A-B1-C3-D-F, and the fourth path rule A-B1-C3-D-E-F) based on the transmitted intent or parameter.

Thus, the user terminal 100 may complete the actions of the apps 141 and 143 based on the selected one path rule.

According to an embodiment, when a user input, information of which is insufficient, is received at an intelligence server 200 of FIG. 6, the NLU module 220 may generate a path rule partially corresponding to the received user input.

For example, the NLU module 220 may transmit the partially corresponding path rule to an intelligence agent 151 of FIG. 2. The intelligence agent 151 may transmit the partially corresponding path rule to an execution manager module 153 of FIG. 2, and the execution manager module 153 may execute a first app 141 of FIG. 2 depending on the path rule. The execution manager module 153 may transmit information about an insufficient parameter to the intelligence agent 151 while executing the first app 141. The intelligence agent 151 may request a user to provide an additional input using the information about the insufficient parameter. When the additional input is received by the user, the intelligence agent 151 may transmit the additional input to the intelligence server 200. The NLU module 220 may generate an added path rule based on information about an intent of the user input which is additionally input and a parameter and may transmit the generated path rule to the intelligence agent 151. The intelligence agent 151 may transmit the path rule to an execution manager module 153 of FIG. 2, and the execution manager module 153 may execute a second app 143 of FIG. 2 depending on the added path rule.

According to an embodiment, when a user input, some information of which is missed, is received at the intelligence server 200, the NLU module 220 may transmit a user information request to a personal information server 300 of FIG. 2. The personal information server 300 may transmit user information stored in a persona DB to the NLU module 220. The NLU module 220 may select a path rule corresponding to the user input, some actions of which are missed, using the user information. Thus, even though the user input, some information of which is missed, is received at the intelligence server 200, the NLU module 220 may request the user to provide the missed information to receive an additional input or may determine a path rule corresponding to the user input using the user information.

Table 1 below may indicate an example form of a path rule associated with a task requested by the user according to an embodiment.

TABLE 1

| Path rule ID | State | Parameter |
|---|---|---|
| Gallery_101 | PicturesView(25) | NULL |
| | SearchView(26) | NULL |
| | SearchViewResult(27) | Location, time |
| | SearchEmptySelectedView(28) | NULL |
| | SearchSelectedView(29) | ContentType, selectall |
| | CrossShare(30) | anaphora |

Referring to Table 1, a path rule generated or selected by an intelligence server (e.g., an intelligence server 200 of FIG. 1) depending on a user utterance (e.g., "Please share your photo with me") may include at least one state 25, 26, 27, 28, 29, or 30. For example, the at least one state (e.g., one action state of a user terminal 100 of FIG. 1) may correspond to at least one of PicturesView 25, SearchView 26, SearchViewResult 27, SearchEmptySelectedView 28, SearchSelectedView 29, or CrossShare 30.

In an embodiment, information about a parameter of the path rule may correspond to at least one state. For example, the information about the parameter of the path rule may be included in SearchSelectedView 29.

A task (e.g., "Please share your photo with me!") requested by a user may be performed as a result of performing a path rule including a sequence of the states 25 to 29.

Figure 8:
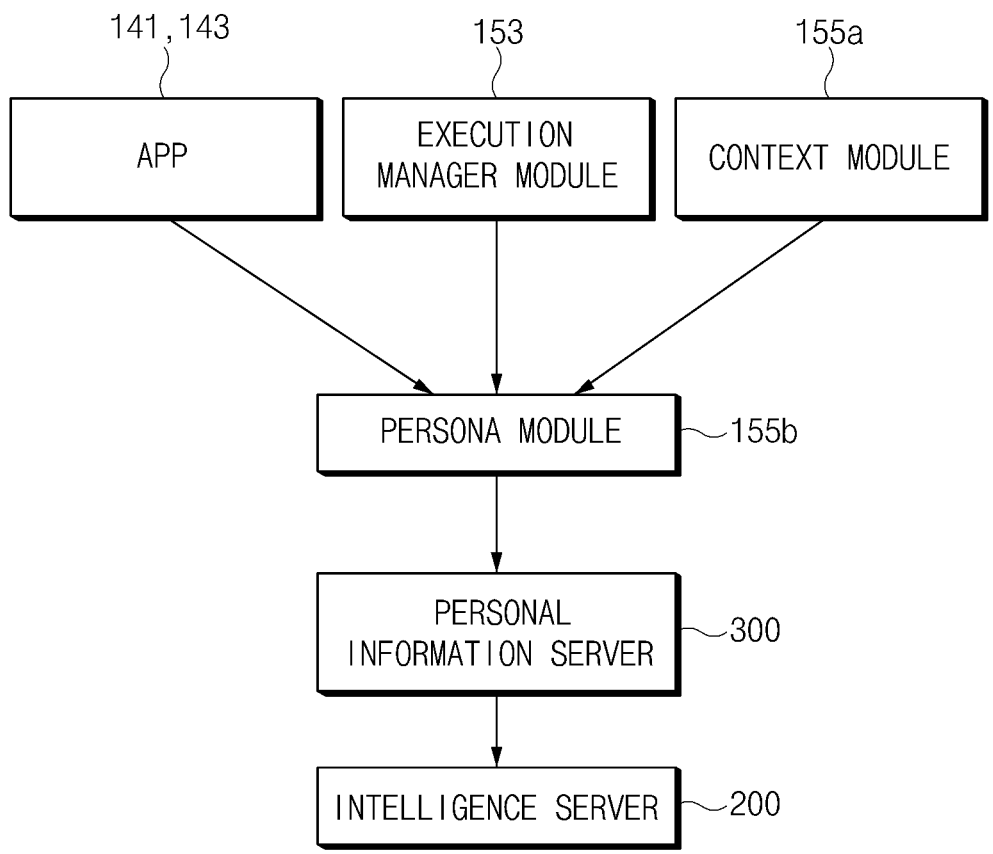
FIG. 8 is a block diagram illustrating a method for managing user information at a persona module of an intelligence service module according to an embodiment of the present disclosure.

FIG. 8 is a block diagram illustrating a method for managing user information at a persona module of an intelligence service module according to an embodiment of the present disclosure.

Referring to FIG. 8, a persona module 155b may receive information of a user terminal 100 of FIG. 2 from apps 141 and 143, an execution manager module 153, or a context module 155a. The apps 141 and 143 and the execution manager module 153 may store information about the result of executing actions 141b and 143b of the apps 141 and 143 in an operation log DB. The context module 155a may store information about a current state of the user terminal 100 in a context DB. The persona module 155b may receive the stored information from the operation log DB or the context DB. Data stored in the operation log DB and the context DB may be analyzed by, for example, an analysis engine to be transmitted to the persona module 155b.

According to an embodiment, the persona module 155b may transmit information, received from the apps 141 and 143, the execution manager module 153, or the context module 155a, to a proposal module 155c of FIG. 2. For example, the persona module 155b may transmit data stored in the operation log DB or the context DB to the proposal module 155c.

According to an embodiment, the persona module 155b may transmit information, received from the apps 141 and 143, the execution manager module 153, or the context module 155a, to a personal information server 300. For example, the persona module 155b may periodically transmit data accumulated and stored in the operation log DB or the context DB to the personal information server 300.

According to an embodiment, the persona module 155b may transmit data stored in the operation log DB or the context DB to the proposal module 155c. User information generated by the persona module 155b may be stored in a persona DB. The persona module 155b may periodically transmit the user information stored in the persona DB to the personal information server 300. According to an embodiment, the information transmitted to the personal information server 300 by the persona module 155b may be stored in the personal DB. The personal information server 300 may infer user information utilizable to generate a path rule of an intelligence server 200 using the information stored in the persona DB.

According to an embodiment, user information inferred using information transmitted by the persona module 155b may include profile information or preference information. The profile information or the preference information may be inferred from an account of a user and accumulated information.

The profile information may include personal information of the user. For example, the profile information may include information about popular statistics of the user. The information about the popular statistics may include, for example, a gender, an age, or the like of the user. For another example, the profile information may include life event information. The life event information may be inferred by comparing, for example, log information with a life event model and may reinforce by analyzing a behavior pattern. For another example, the profile information may interest information. The interest information may include, for example, information about an interest shopping product, an interest field (e.g., sports, politics, or the like). For another example, the profile information may include information about an activity area. The information about the activity area may include, for example, information about home, a working place, or the like. The information about the activity area may include information about an area with a recorded priority with reference to an accumulated time of stay and the number of visits as well as information about a location of a place. For another example, the profile information may include information about an activity time. The information about the activity time may include, for example, information about a wake-up time, a commute time, or a sleep time. Information about the commute time may be inferred using information about the activity area (e.g., home and a working place). Information about the sleep time may be inferred from a time when the user terminal 100 is not used.

The preference information may include information about a preference of the user. For example, the preference information may include information about an app preference. The app preference may be inferred from, for example, a usage record of an app (e.g., a usage record for each time or place). The app preference may be used to determine an app to be executed according to a current state (e.g., time or a place) of the user. For another example, the preference information may include information about contact preference. The contact preference may be inferred by analyzing, for example, information about contact frequency of contact information (e.g., contact frequency for each time or place). The contact preference may be used to determine contact information (e.g., a duplicated name) to which the user will make a call depending on a current state of the user. For another example, the preference information may include setting information. The setting information may be inferred by analyzing, for example, information about a setting frequency of a specific setting value (e.g., frequency set to a setting value for each time or place). The setting information may be used to set the specific setting value depending on a current state (e.g., time, a place, or a situation) of the user. For another example, the preference information may include a place preference. The place preference may be inferred from, for example, visit records of a specific place (e.g., visit records for each time). The place preference may be used to determine a place which is visited according of a current state (e.g., time) of the user. For another example, the preference information may include a command preference. The command preference may be inferred from, example, a frequency of use of a command (e.g., a frequency of use for each time or place). The command preference may be used to determine a command pattern to be used according to a current state (e.g., time or a place) of the user. Particularly, the command preference may include information about a menu which is most frequently selected by the user, based on analyzed log information, in a current state of an app which is being executed.

Figure 9:
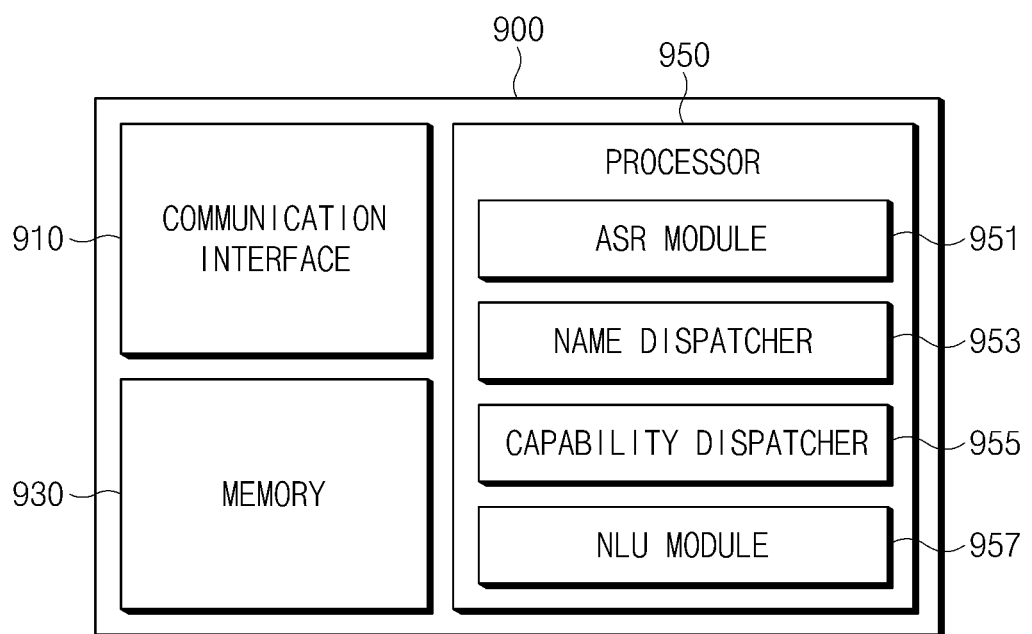
FIG. 9 is a block diagram illustrating a system associated with voice processing according to an embodiment of the prevent disclosure.

FIG. 9 is a block diagram illustrating a system associated with voice processing according to an embodiment of the prevent disclosure.

According to an embodiment, a system 900 (or an electronic device) (or an intelligence server 200 of FIG. 2) may provide an artificial intelligence (AI) service based on AI technology. For example, the system 900 may receive a user input such as voice data obtained through an utterance of a user and may analyze and understand the received user input to determine an action suitable for a request of the user, thus performing the determined action. According to an embodiment, the system 900 may be configured as one electronic device or may be configured in a complex manner using a plurality of electronic devices.

According to an embodiment, the system 900 may determine an app to process a request of the user. For example, when an app to process a request of the user is explicitly designated through an utterance of the user, the system 900 may process the request of the user using at least one defined action of the designated app. For another example, when an app to process a request of the user is not explicitly designated through an utterance of the user, the system 900 may process the request of the user by analyzing voice data obtained in response to an utterance input of the user, determining a capability corresponding to the request of the user based on the analyzed result, verifying an app mapped to the determined capability, and determining the mapped app as the app to process the request of the user.

According to an embodiment, when there are a plurality of apps capable of processing a request of the user, the system 900 may provide a method for determining a proper app to process the request of the user among the plurality of apps. For example, when there are the plurality of apps capable of processing a request of the user, the system 900 may determine any one of the plurality of apps based on a preference of the user, a history where each of the plurality of apps is selected, or the like. For example, when there are the plurality of apps capable of processing a request of the user, the system 900 may provide a user interface (UI) for supporting to select any one of the plurality of apps. In this case, the system 900 may determine an app to process the request of the user through a user input for selecting any one of the plurality of apps.

The app may include, for example, an app downloadable from a server (e.g., an app store) which provides an app download service, a web app, an app which operates in a chatbot mode, or the like. Further, the app may include, for example, an app installed in an electronic device (e.g., a user terminal 100 of FIG. 2) which uses the system 900 (e.g., an intent classifier), an app installed in an electronic device which uses an external server, an app of a chatbot mode executed in the system 900 or the external server, or the like.

Referring to FIG. 9, the system 900 for performing the above-mentioned function may include a communication interface 910, a memory 930, and a processor 950. However, the elements of the system 900 are not limited thereto. According to various embodiments, the system 900 may further include at least one other element(s) other than the above-mentioned elements. Further, the system 900 may perform the above-mentioned function using one device or may perform the above-mentioned function in a complex or linked manner using two or more devices.

According to an embodiment, the communication interface 910 (or a network interface) may support to establish a communication channel between the system 900 and an external device (e.g., the user terminal 100 or an external server (not shown)) and perform wired and wireless communication over the established communication channel. For example, the communication interface 910 may receive data associated with a user voice obtained through a microphone (e.g., a microphone 111), from an external device (e.g., the user terminal 100) including the microphone. For another example, the communication interface 910 may provide (transmit) data associated with an app to an external device (e.g., the user terminal 100) including a user interface (UI) (e.g., a display 120) such that the external device may display a screen for supporting for the user to select the app. According to an embodiment, the system 900 (e.g., an intelligence server 200) may be connected with an external server (e.g., a search engine, a chatbot server, or the like) via the communication interface 910. For example, the system 900 may transmit data or an execution request to the external sever via the communication interface 910.

According to an embodiment, the memory 930 may store a command (or instructions) or data associated with at least one other element of the system 900. For example, the memory 930 may store software and/or a program. The software and/or the program may include, for example, a module (e.g., an automatic speech recognition (ASR) module, a natural language understanding (NLU) module 220, or the like) associated with AI technology. The software and/or the program may include, for example, one or more instructions associated with a function (or an operation) implemented in the system 900. The one or more instructions may be loaded into a volatile memory by the processor 950 and may be processed according to a specified program routine.

According to an embodiment, when an app capable of processing a request of the user is not explicitly designated through an utterance of the user, the memory 930 may store information capable of determining an app to process the request of the user. For example, when an identifier (e.g., a name) of an app is not included in text data obtained by converting voice data obtained in response to an utterance input of the user, the memory 930 may store comparison information used to determine a capability corresponding to a request of the user. The comparison information may include, for example, at least one sentence, at least one phrase, and/or at least one word, corresponding to the capability. For example, when the user speaks a first sentence (e.g., "Please order a pizza."), the first sentence may be mapped to a first capability corresponding to a request of the user which wants to receive a first service (e.g., pizza delivery) to be stored in the memory 930. Comparison information mapped to the first capability may be stored in the form of at least one phrase or at least one word (e.g., "pizza", "order", or the like) configuring the first sentence, as well as in the form of the first sentence.

According to an embodiment, the memory 930 may store information associated with a capability corresponding to a request of the user. Table 2 below may indicate an example form of information associated with the capability according to an embodiment.

TABLE 2

| Capability | APP list | User history |
|---|---|---|
| Pizza delivery | Domino's Pizza, Papa John's Pizza, Pizza Hut | Pizza Hut |
| Sports information provision | ESPN, NBA, KBO | KBO |
| Music playback | Samsung Music, Milk Music | |
| ... | ... | ... |

Referring to FIG. 2, the memory 930 may separately store a capability corresponding to a request of the user for each category (e.g., pizza delivery, sports information provision, music playback, or the like) of a service. Further, the memory 930 may separately store a list of apps capable of performing a capability for each category of a service. For example, the memory 930 may store a first app list including apps (e.g., Domino's Pizza, Papa John's Pizza, Pizza Hut, or the like) capable of providing the first service (e.g., the pizza delivery), a second app list including apps (e.g., ESPN, NBA, KBO, or the like) capable of providing a second service (e.g., sports information provision), or a third app list including apps (e.g., Samsung Music, Milk Music, or the like) capable of a third service (e.g., music playback). According to an embodiment, the memory 930 may store information about a history where an app is selected in an app list including the apps capable of performing the capability. For example, the memory 930 may store information about a first app (e.g., Pizza Hut) which is recently selected in the first app list including the apps capable of providing the first service or information about a second app (e.g., KBO) which is recently selected in a second app list including the apps capable of providing the second service.

According to an embodiment, the processor 950 may execute an arithmetic operation or data processing associated with control and/or communication of at least one other element(s) of the system 900. The processor 950 may drive, for example, an operating system (OS) or an application program to control a plurality of hardware or software elements connected to the processor 950 and may perform a variety of data processing and various arithmetic operations. According to an embodiment, the processor 950 may be implemented as a system on chip (SoC).

According to an embodiment, the processor 950 may include an ASR module 951, a name dispatcher (or a named dispatcher or an app dispatcher) 953, a capability dispatcher 955, and an NLU module 957. However, the elements of the processor 950 are not limited thereto. According to various embodiments, the processor 950 may further include at least one other element(s) other than the above-mentioned elements. According to an embodiment, at least some of the above-mentioned elements may be implemented in the form of being integrated with each other. For example, the name dispatcher 953 and the capability dispatcher 955 may be integrated into one element.

According to an embodiment, the ASR module 951 may perform the same or similar function to an ASR module 210 of an intelligence server 200 shown in FIG. 6. For example, the ASR module 951 may convert a user input (e.g., voice data) received from an external device (e.g., the user terminal 100) connected to the system 900 through the communication interface 910 into text data.

According to an embodiment, the name dispatcher 953 may determine whether an identifier (e.g., a name) of an app is included in the text data converted by the ASR module 951. When the identifier of the app is included in the text data, the name dispatcher 953 may determine the app as an app to process a request of the user. For example, the name dispatcher 953 may compare text data corresponding to an utterance input of the user with a specified format (e.g., "please yy at xx") and may verify whether a portion corresponding to a portion (e.g., a portion ("xx") located behind the word "at") where an identifier of an app is located in the text format exists in the text data. Further, when the portion corresponding to the portion where the identifier of the app is located exists in the text data, the name dispatcher 953 may determine a word located in the corresponding portion as the identifier of the app. For example, the name dispatcher 953 may divide the entre sentence of the text data into specific units (e.g., phrases or words) and may compare each of the divided units with an identifier of an app to determine whether there is the identifier of the app as a result of the comparison.

According to an embodiment, when an identifier of an app is not included in text data converted by the ASR module 951, the capability dispatcher 955 may determine whether an utterance of the user requests any capability to determine an app capable of performing the capability. For example, the capability dispatcher 955 may compare the text data with comparison information stored in the memory 930 and may determine the app based on the compared result. The comparison information may include, for example, at least one sentence, at least one phrase, and/or at least one word, corresponding to the capability. For example, when text data corresponding to an utterance of the user is matched with first information included in the comparison information, the capability dispatcher 955 may determine a first capability mapped to the first information as a capability corresponding to a request of the user and may determine at least one app capable of performing the first capability as an app capable of processing the request of the user.

According to an embodiment, the capability dispatcher 955 may compare the entire text data corresponding to an utterance of the user with the comparison information. For example, when the text data is configured with a first sentence (e.g., "Please order a pizza."), the capability dispatcher 955 may compare the entire first sentence with the comparison information. In other words, when the same sentence as the first sentence is included in the comparison information, the capability dispatcher 955 may determine a capability mapped to the same sentence as a capability corresponding to a request of the user.

According to an embodiment, the capability dispatcher 955 may divide text data corresponding to an utterance of the user into specific units (e.g., phrases, words, or the like) and may compare the divided units with the comparison information. In other words, the capability dispatcher 955 may divide the text data into principal components (or units) through sentence parsing and may compare the principal components with the comparison information. For example, when the text data is configured with a second sentence (e.g., "Please order a pizza."), the capability dispatcher 955 may extract (or divide) an object ("pizza") and a verb ("order") through sentence parsing of the second sentence and may compare the extracted (or divided) object and verb with the comparison information. In this case, when information matched with the object and the verb is included in the comparison information, the capability dispatcher 955 may determine a capability mapped to the information as a capability corresponding to a request of the user.

According to an embodiment, the capability dispatcher 955 may determine a capability corresponding to a request of the user using additional information, for example, information about a state of an app which is being executed at an utterance time of the user or at a time requested to execute an AI service, as well as text data corresponding to an utterance of the user. For example, when a specific app is executed at the utterance time of the user or the time requested to execute the AI service, the capability dispatcher 955 may determine a capability corresponding to a request of the user as a function associated with the specific app. For example, in a state where a specific app associated with pizza delivery is executed, when the user speaks "please order this", the capability dispatcher 955 may determine a capability corresponding to a request of the user as a capability associated with the specific app, that is, pizza delivery.

According to an embodiment, the capability dispatcher 955 may determine a capability corresponding to a request of the user through deep learning using AI technology such as machine learning and a neural network. For example, the capability dispatcher 955 may determine a capability to process a request of the user by receiving various utterances corresponding to each capability, combining capabilities to process the request of the user corresponding to each capability, training a model corresponding to the combination of the capabilities, and comparing the utterance of the user to the trained model. For example, when a plurality of capabilities, each of which has reliability, are output as a result of the compared result, the capability dispatcher 955 may determine one capability with the reliability of a threshold or more as a capability to process the request of the user. In this case, the capability dispatcher 955 may determine a capability with the highest reliability among capabilities, each of which has the reliability of the threshold or more, as the capability to process the request of the user.

According to an embodiment, when the capability to process the request of the user is determined, the capability dispatcher 955 may verify at least one app to perform the capability. For example, the capability dispatcher 955 may verify at least one app to perform a capability, using information associated with the capability corresponding to a request of the user, stored in the memory 930. For example, the capability dispatcher 955 may verify an app list (e.g., an app list of Table 2) including apps capable of performing the capability through the information stored in the memory 930 and may provide data associated with the app list to an external device (e.g., the user terminal 100).

According to an embodiment, the capability dispatcher 955 may transmit data associated with the app list to the external device via the communication interface 910 such that the external device (e.g., the user terminal 100) including the UI (e.g., the display 120) outputs a screen which supports for the user to select one of apps included in the app list. In this case, the external device may output the screen for supporting to select one of the apps included in the app list. When the user selects one of the apps included in the app list, the external device may feed data associated with the selected app back to the system 900.

According to an embodiment, the capability dispatcher 955 may select (or determine) one of the apps included in the app list as an app to perform the capability, based on information of a history where the app is selected or a preference of the user. For example, the capability dispatcher 955 may select (or determine) an app which recently performed the capability as an app to perform the capability.

According to an embodiment, the capability dispatcher 955 may classify a capability corresponding to a request of the user for each category of a service and may designate an app to perform the capability for each category of the service. In other words, the capability dispatcher 955 may designate a default app to perform a capability for each category of a service. For example, the capability dispatcher 955 may designate a default app to perform a first capability as a first app and may designate a default app to perform a second capability as a second app. In some embodiments, the capability dispatcher 955 may transmit data associated with an app list including apps capable of performing a specific function to an external device including a UI via the communication interface 910 such that the external device may output a screen which supports for the user to set a default app to perform the specific capability. In this case, the external device may output a screen for supporting to set one of the apps included in the app list to the default app. When the user sets one of the apps included in the app list to the default app, the external device may feed data associated with the set app back to the system 900.

According to an embodiment, the system 900 may designate a default app to perform a capability corresponding to a specified service, based on discussed contents through a partnership or contract (e.g., an advertising contract) with a content provider (CP) which provides the specified service. For example, when the system 900 attempts to have a promotion with a specific CP and when a capability determined by the capability dispatcher 955 corresponds to a service provided from the specific CP, the system 900 may designate an app provided by the specific CP to a default app to perform the capability.

According to an embodiment, when there are a plurality of CPs, each of which provides a specified service, the system 900 may first provide an app provided by a specific CP among the plurality of CPs based on the discussed contents. For example, the system 900 may display an app provided by the specific CP on a higher end of a screen than apps provided from the plurality of CPs or may display the app provided by the specific CP to be different from the other apps. For example, when attempting to have a promotion with a specific CP, the system 900 may display an app provided by the specific CP on an upper screen of a screen or may highlight the app provided by the specific CP as compared with apps provided from the other CPs. Further, the system 900 may display contents to be promoted together while displaying an app provided from the specific CP, such that the user may know benefits capable of being obtained when he or she uses the app which is being promoted.

According to an embodiment, the capability dispatcher 955 may manage an app list including apps capable of performing a capability corresponding to a request of the user. For example, the capability dispatcher 955 may receive information about an app included in the app list from an external server (e.g., an app store capable of downloading an app, or the like). For example, when information about a new app which is not included in the app list is received from the external server, the capability dispatcher 955 may add the new app to the app list. For another example, when a request to delete an app included in the app list is received from an external server (e.g., an app list management server), the capability dispatcher 955 may delete the app requested to be deleted, from the app list.

According to an embodiment, the NLU module 957 included in the system 900 may perform the same or similar function to the NLU module 220 of the intelligence server 200 shown in FIG. 6. The NLU module 957 may perform a syntactic analysis or a semantic analysis for the converted text data to determine an intent of the user. Thus, the NLU module 957 may obtain a domain, intent, or a parameter (or a slot) utilizable to express the intent from a user input through the above-mentioned analysis. Further, the NLU module 957 may determine an intent of the user and a parameter using a matching rule divided into a domain, intent, and a parameter (or a slot) and may generate a path rule based on the determined intent of the user and the determined parameter. For example, the NLU module 957 may select an app to be executed based on an intent of the user and may determine an action to be performed in the selected app. Further, the NLU module 957 may determine a parameter corresponding to the determined action and may generate (or select) a path rule. In an embodiment, the path rule generated by the NLU module 957 may include information about an app to be executed, an action (e.g., at least one or more states) to be executed in the app, and a parameter utilizable to execute the action.

According to an embodiment, the NLU module 957 may transmit a path rule to the external device (e.g., the user terminal 100) depending on a request for a user input. For example, the NLU module 957 may transmit at least one path rule corresponding to a user input to the external device.

As described above, according to various embodiments, an electronic device may include a network interface (e.g., the communication interface 910), at least one processor (e.g., the processor 950) configured to be operatively connected with the network interface, and at least one memory (e.g., the memory 930) configured to be operatively connected with the at least one processor. The at least one memory may store instructions, when executed, causing at least one processor to receive first data associated with a first user input obtained through a first external device, from the first external device including a microphone phone and a user interface (UI), via the network interface, the first user input including a request to perform a task executable at least in part using at least one application program which is not indicated by the first user input, perform automatic speech recognition (ASR) for the first data for providing a first text, verify at least one application program based at least in part on the first text, when the at least one application program is verified, provide second data associated with the at least one application program to the first external device via the network interface such that the first external device indicates the at least one application program on the UI of the first external device, and when the at least one application program is not verified, perform natural language understanding (NLU) for the first text.

According to various embodiments, the instructions may cause the at least one processor to verify the at least one application program by comparing the first text with at least one of a plurality of selected sentences, a plurality of selected phrases, or a plurality of selected words, the sentences, and the phrases, and the words being stored in the memory.

According to various embodiments, the instructions may cause the at least one processor to perform the NLU by verifying a domain and intent based on the first text.

According to various embodiments, the at least one application program may include at least one of an application program downloadable from an app store, a web application program, or an application program which operates in a chatbot mode.

According to various embodiments, the instructions may cause the at least one processor to perform an Internet search, when it fails to verify the at least one application program through the NLU.

According to various embodiments, the instructions may cause the at least one processor to receive a user selection on an application program of the at least one application program through the first external device, after the first external device indicates the at least one application program on the UI.

According to various embodiments, the instructions may cause the at least one processor to allow the first external device to perform the task based on the user selection.

According to various embodiments, the instructions may cause the at least one processor to allow the first external device to display the result of performing the task by an external server, based on the user selection.

According to various embodiments, the instructions may cause the at least one processor to perform the task using selected one which is available to the selected application program among a downloadable application program, a web application program, or an application program which operates in a chatbot mode.

Figure 10:
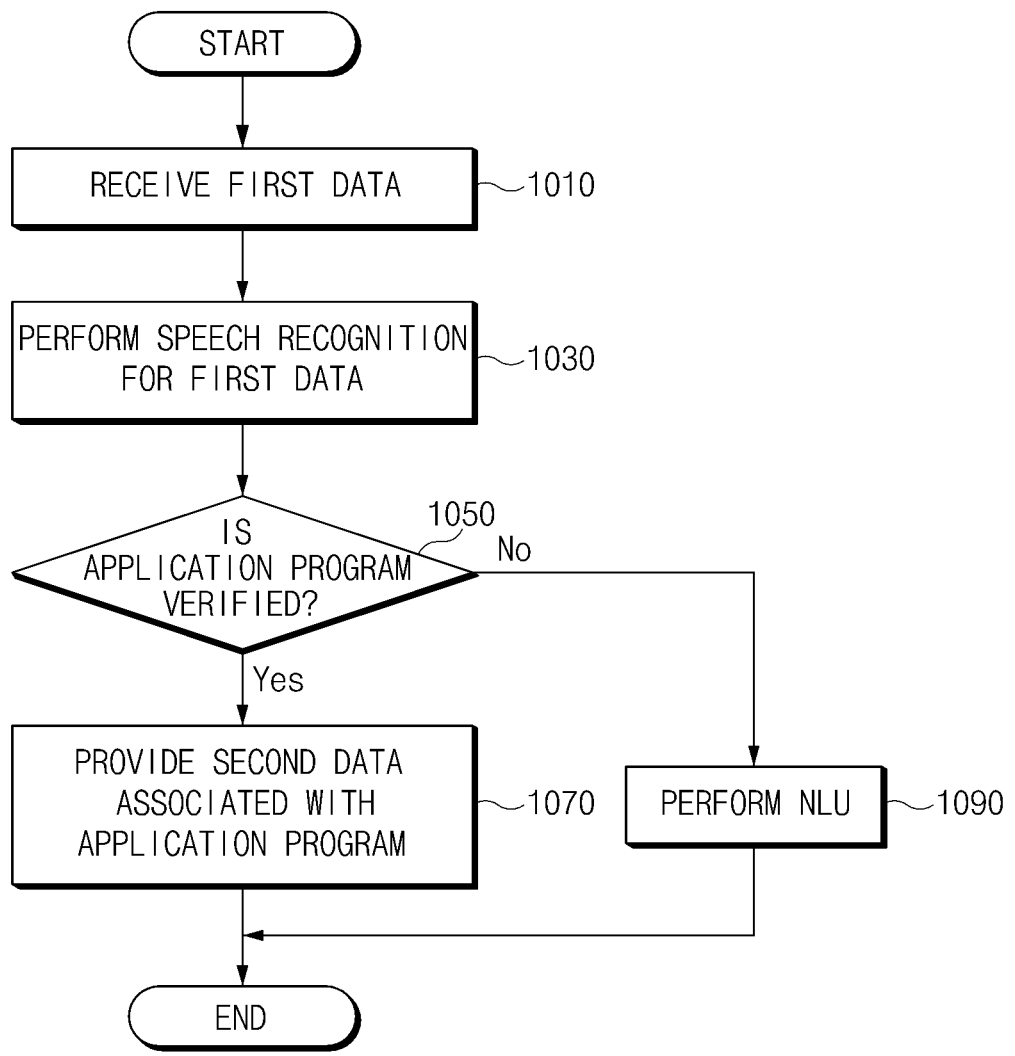
FIG. 10 is a flowchart illustrating an operation method of a system associated with voice processing according to an embodiment of the present disclosure.

FIG. 10 is a flowchart illustrating an operation method of a system associated with voice processing according to an embodiment of the present disclosure.

Referring to FIG. 10, in operation 1010, an ASR module 951 of a system 900 of FIG. 9 may receive first data associated with a user input from an external device (e.g., a user terminal 100 of FIG. 2) including a microphone, via a communication interface 910 of FIG. 9. The first data may include, for example, voice data corresponding to an utterance of a user as captured by the microphone of the external device and then transmitted. According to an embodiment, the first data may include voice data obtained in a state where the user does not explicitly speak an identifier of an app.

In operation 1030, the ASR module 951 may perform speech recognition on the first data. For example, the ASR module 951 may convert voice data into text data (i.e., extract textual data from the received voice data).

In operation 1050, a capability dispatcher 955 of the system 900 may verify (or select) a particular application (i.e., an app) to process a request of the user indicated in the text data. According to an embodiment, the capability dispatcher 955 may compare the text data with comparison information stored in a memory 930 of FIG. 9 (which may include a number of predesignated requests or commands and indications of one or more applications capable of processing those requests or commands) and may determine a capability or functionality to execute corresponding to a request of the user identified by the comparison, thus verifying/selecting an app to utilize in order process the user's request.

According to an embodiment, the capability dispatcher 955 may compare the entire text data with the comparison information, or may divide the text data into sentence construction units (e.g., paragraphs, words, or the like) and may compare the divided sentence construction units with the comparison information. Further, when the text data and the comparison information are at least in part matched, the capability dispatcher 955 may determine a capability mapped to the comparison information as a capability corresponding to a request of the user.

According to an embodiment, when the capability corresponding to the request of the user is determined, the capability dispatcher 955 may verify/select at least one app (or an app list) capable of the determined function, from the memory 930.

According to an embodiment, when the at least one app to process the capability is verified and/or selected, in operation 1070, the capability dispatcher 955 may provide (or transmit) second data associated with the at least one app to an external device (e.g., the user terminal 100) including a UI, via the communication interface 910. In this case, the external device may indicate (or display) the app on the UI.

According to an embodiment, when the app to process the capability is not verified and/or a corresponding app for processing the user request is not identified in the comparison, in operation 1090, an NLU module 957 of the system 900 may perform NLU for the text data. For example, the NLU module 957 may perform a syntactic analysis or a semantic analysis for the text data to determine an intent of the user. Thus, the NLU module 957 may obtain a domain, intent, or a parameter (or a slot) utilizable to express the intent from a user input through the above-mentioned analysis. Further, the NLU module 957 may determine an intent of the user and a parameter using a matching rule divided into a domain, intent, and a parameter (or a slot) and may generate (or select) a path rule based on the determined intent of the user and the determined parameter. According to an embodiment, after operation 1090, the NLU module 957 may transmit the generated (or selected) path rule to the external device (e.g., the user terminal 100).

Figure 11:
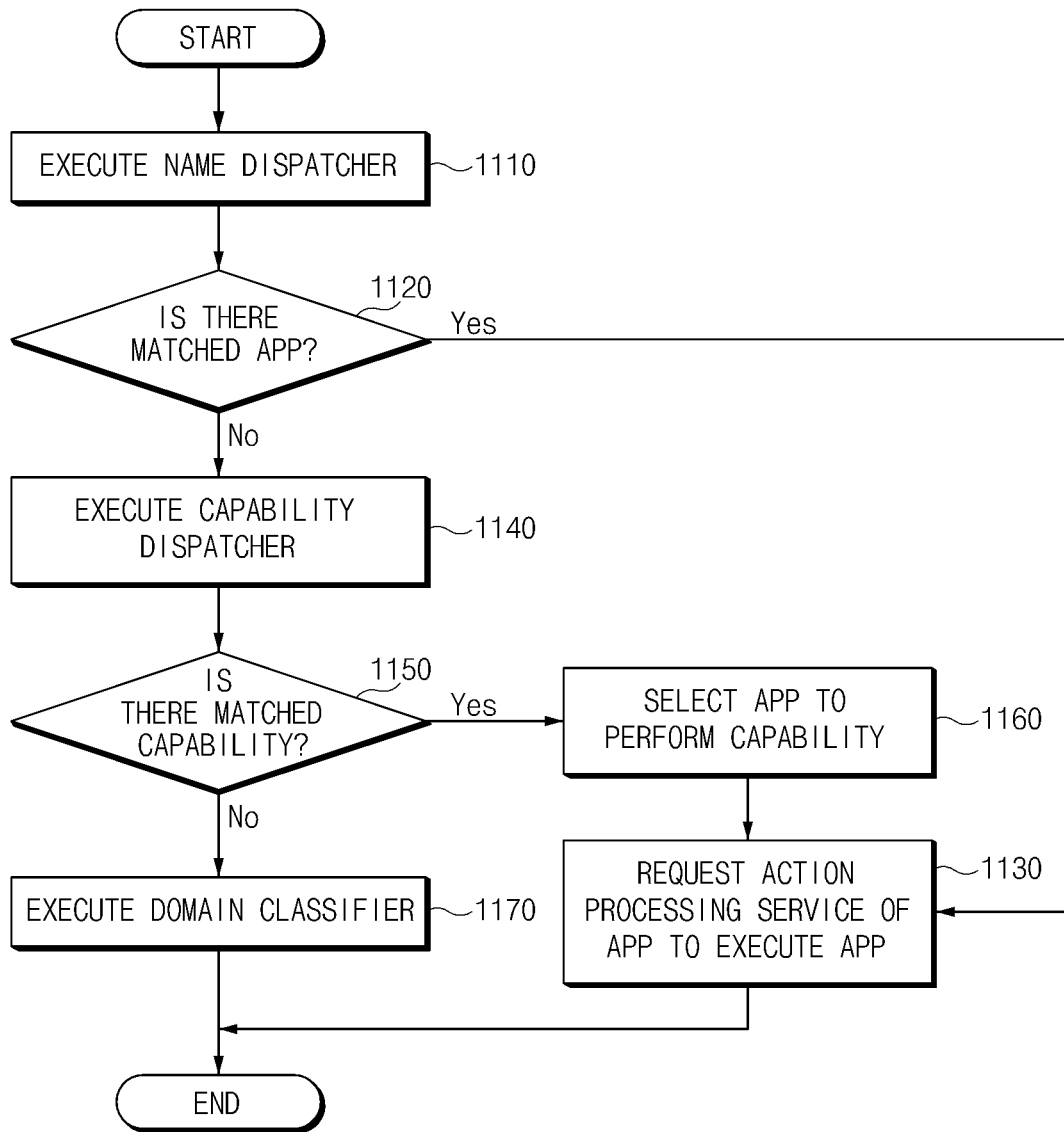
FIG. 11 is a flowchart illustrating an operation method of a system associated with determining an app to process a request of a user, according to an embodiment of the present disclosure.

FIG. 11 is a flowchart illustrating an operation method of a system associated with determining an app to process a request of a user, according to an embodiment of the present disclosure.

Referring to FIG. 11, when receiving voice data from an external device (e.g., a user terminal 100 of FIG. 2) via a communication interface 910 of a system 900 of FIG. 9, an ASR module 951 of the system 900 may convert the voice data into text data (e.g., and/or extract textual data from the voice data).

In operation 1110, a processor 950 of the system 900 may execute a name dispatcher 953 of FIG. 9. For example, the processor 950 may verify whether an identifier of an app is included in the text data using the name dispatcher 953. For example, the name dispatcher 953 may compare the converted or extracted text data with a specified text format and may verify whether a portion of the text data indicates an identifier of an app. Further, when the identifier is detected as extant within the text data, the name dispatcher 953 may determine a word disposed in the corresponding portion as an identifier of the corresponding app. For another example, the name dispatcher 953 may divide the entire sentence of the text data into sentence construction units and may compare the divided sentence construction units with an identifier of each app to determine whether there is an identifier of the app as a result of the comparison, without using the specified text format.

In operation 1120, the name dispatcher 953 may determine whether there is an app matching to the text data. For example, when an identifier of an app is included in the text data, the name dispatcher 953 may determine that the text data and the app match.

According to an embodiment, when there is an app matching the text data, in operation 1130, the processor 950 may request an action processing service of the matched app to execute the app to process a request of the user. According to an embodiment, the app may be a "domain," which indicates a set of intents (e.g., functions or commands) capable of being processed in the domain.

According to an embodiment, when there is no the app matching the text data, in operation 1140, the processor 950 may execute a capability dispatcher 955. For example, the processor 950 may determine whether an utterance of the user requests any capability, using the capability dispatcher 955. For example, the capability dispatcher 955 may compare the text data with comparison information stored in a memory 930 of FIG. 9 and may determine a capability (e.g., a function) corresponding to a request of the user based on the compared result. According to an embodiment, the capability dispatcher 955 may compare the entire text data with the comparison information (e.g., such as a database of known executable functions on the device), or may divide the text data into sentence construction units and may compare the divided sentence construction units with the comparison information. The comparison information may include, for example, at least one sentence, at least one phrase, and/or at least one word, corresponding to the capability.

In operation 1150, the capability dispatcher 955 may determine whether there is a capability matched to the text data (e.g., a known executable function able to process any requests or commands in the text data). For example, when the text data and the comparison information are at least in part matched with each other, the capability dispatcher 955 may determine that a capability matched to the comparison information is matched to the text data and may determine the matched capability as a capability corresponding to a request of the user.

According to an embodiment, when there is the capability matched to the text data, in operation 1160, the capability dispatcher 955 may select (or determine) an app to execute the requested function (i.e., performing the capability) corresponding to the request of the user, that is, the matched capability. For example, the capability dispatcher 955 may verify an app list including apps capable of performing the matched capability from the memory 930 and may select (or determine) one of the apps included in the app list as an app to process the matched capability based on a user input. According to an embodiment, the system 900 may transmit information about the app list to the external device (e.g., the user terminal 100) via the communication interface 910. In this case, the external device may provide the information about the app list to the user through a UI. When receiving a user input for selecting any one of the apps included in the app list, the external device may feed the user input back to the system 900. Thus, the system 900 may select (or determine) one of the apps included in the app list as an app to process the matched capability based on the user input received from the external device. Further, when the app to process the matched capability is selected (or determined), the processor 950 may perform operation 1130. In other words, the processor 950 may request an action processing service of the selected (or determined) app to execute the app to process a request of the user.

According to an embodiment, when there is no the capability matched to the text data, in operation 1170, the processor 950 may execute a domain classifier (e.g., an NLU module 957 of FIG. 9). For example, the processor 950 may determine a domain according to an utterance of the user using the domain classifier. For example, the domain classifier may perform a syntactic analysis or a semantic analysis for the text data and may determine a domain.

Figure 12:
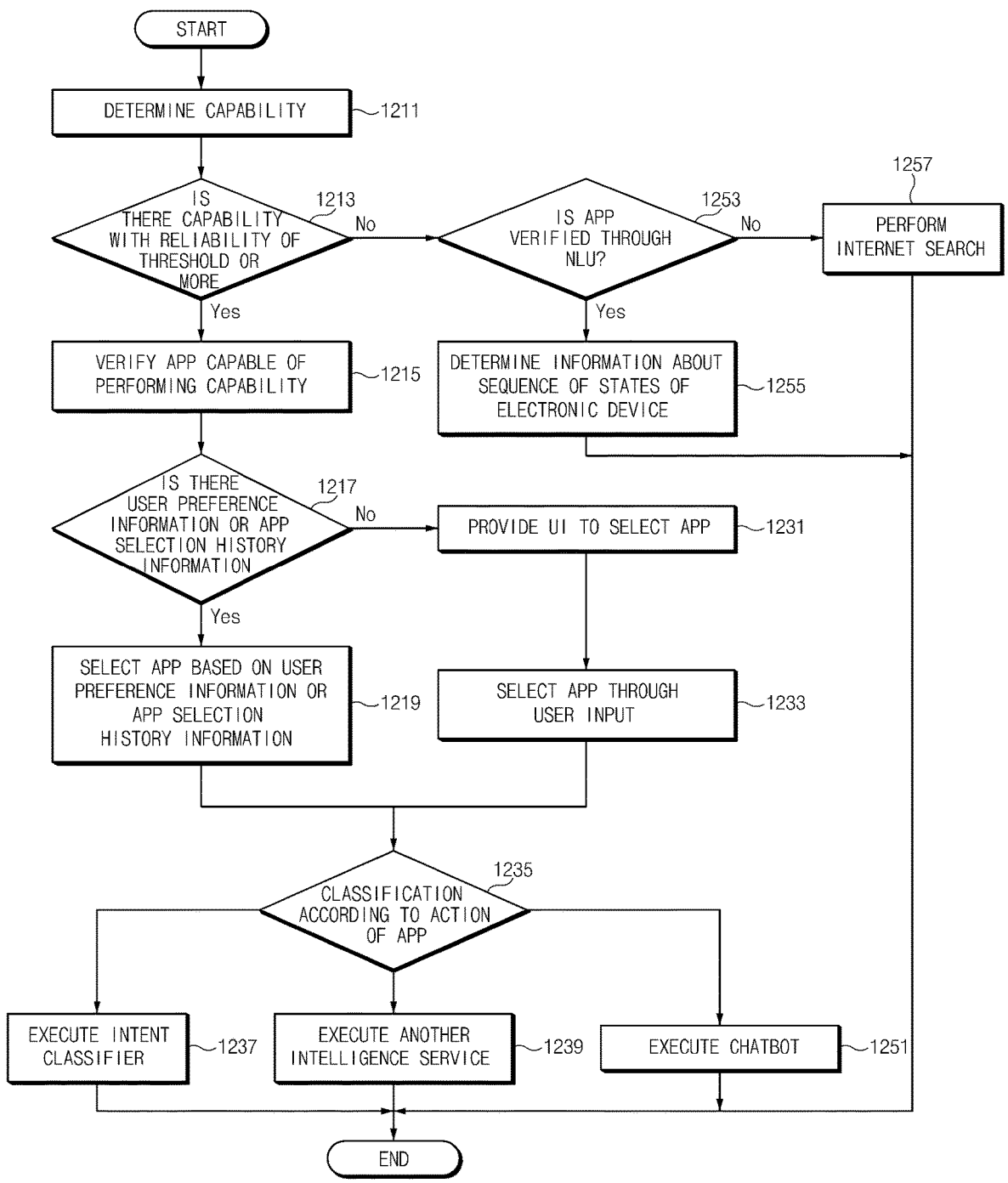
FIG. 12 is a flowchart illustrating an operation method of a system associated with determining an app when an app to process a request of a user is not explicitly designated through an utterance of the user, according to an embodiment of the present disclosure.

FIG. 12 is a flowchart illustrating an operation method of a system associated with determining an app when an app to process a request of a user is not explicitly designated through an utterance of the user, according to an embodiment of the present disclosure.

Referring to FIG. 12, when an app to process a request of a user is not explicitly designated through an utterance of the user, in operation 1211, a processor 950 of a system 900 of FIG. 9 may determine whether the utterance of the user requests any capability using a capability dispatcher 955 of FIG. 9. According to an embodiment, the capability dispatcher 955 may determine a capability to process a request of the user by comparing a trained model corresponding to a combination of capabilities with an utterance of the user (or text data corresponding to the utterance of the user).

In operation 1213, where a plurality of capabilities, each of which has reliability, are output as a result of the comparison, the capability dispatcher 955 may determine whether there is a capability with the reliability of a threshold or more.

According to an embodiment, when there is the capability with the reliability of the threshold or more, in operation 1215, the capability dispatcher 955 may verify at least one app capable of performing the capability with the reliability of the threshold or more. According to an embodiment, the capability dispatcher 955 may verify an app list including apps capable of performing the capability with the reliability of the threshold or more from a memory 930 of FIG. 9.

In operation 1217, the capability dispatcher 955 may determine whether there is information about a preference of the user or information about a history where an app is selected, in connection with the app of performing the capability with the reliability of the threshold or more. According to an embodiment, the capability dispatcher 955 may determine whether the user preference information or the app selection history information associated with the app list is stored in the memory 930.

When there is the user preference information or the app selection history information, in operation 1219, the capability dispatcher 955 may select an app capable of performing the capability with the reliability of the threshold value or more, based on the user preference information or the app selection history information. For example, the capability dispatcher 955 may select any one from the apps included in the app list based on the user preference information or the app selection history information.

When there is no the user preference information or the app selection history information, in operation 1231, the capability dispatcher 955 may provide a UI such that the user may select an app capable of performing the capability with the reliability of the threshold or more. In some embodiments, the capability dispatcher 955 may transmit data associated with an app to an external device (e.g., a user terminal 100) including a UI via a communication interface 910 of FIG. 9 such that the external device may provide a screen for supporting to select the app to the user. The screen for supporting to select the app may be, for example, a screen which displays an app list.

In operation 1233, the capability dispatcher 955 may select an app capable of performing the capability with the reliability of the threshold or more, through a user input. For example, when receiving a user input for selecting any one of apps included in the app list through a UI, the capability dispatcher 955 may select the app capable of performing the capability with the reliability of the threshold or more based on the user input. For another example, the capability dispatcher 955 may obtain a user input for selecting any one of the apps included in the app list from the external device via the communication interface 910 and may select an app capable of performing the capability with the reliability of the threshold or more, based on the user input.

In operation 1235, the processor 950 may perform classification according to an action of the selected app. For example, the processor 950 may determine whether an action processing service of an app to perform the capability is implemented in any manner or in any system. When such a determination operation is able to be performed differently according to a type of an app, the processor 950 may transmit a request a module for the determination to execute the app. The module for determination may perform, for example, operation 1237 when the app is operated in the system 900, may perform operation 1239 when the app is operated in another intelligence service, and may perform operation 1251 when the app is operated in a chatbot mode.

According to an embodiment, in operation 1237, the processor 950 may execute an intent classifier (e.g., an NLU module 957 included in the system 900). For example, the processor 950 may determine intent according to an utterance of the user using the intent classifier. For example, the intent classifier may perform a syntactic analysis or a semantic analysis for the text data to determine an intent of the user. Thus, the intent classifier may obtain a domain, intent, or a parameter (or a slot) utilizable to express the intent from the text data through the above-mentioned analysis.

According to an embodiment, when the app is included in the other intelligence service, in operation 1239, the processor 950 may request the other intelligence service to execute an action of the app. According to an embodiment, the other intelligence service may be included in an external server (not shown). When the app is an app executed in the external server, the processor 950 may request the external server to execute an action of the app. In this case, the external server may transmit the result of executing the app to an external device (e.g., the user terminal 100). The external device may display the result of executing the app on its display.

According to an embodiment, when the app determines or execute an action in a chatbot mode, in operation 1251, the processor 950 may be connected to a chatbot. According to an embodiment, an app which operates in the chatbot mode may be included in an external server. When the app is an app of a chatbot mode executed in the external server, the processor 950 may request the external server to execute an action of the app of the chatbot mode and may transmit and receive data corresponding to chat contents with the external server via the communication interface 910 to chat with the app of the chatbot mode.

According to an embodiment, when there is no the capability with the reliability of the threshold or more in operation 1213, in operation 1253, the processor 950 may determine whether an app to process a request of the user is verified through NLU for the text data. For example, the processor 950 may execute the NLU module 957 to perform a syntactic analysis or a semantic analysis for the text data and determine an intent of the user. Thus, the NLU module 957 may obtain a domain, intent, or a parameter (or a slot) utilizable to express the intent from the text data through the above-mentioned analysis.

When the app to request the request of the user is verified, in operation 1255, the NLU module 957 may determine (or select) information about a sequence of states of an electronic device to process the request of the user. For example, the NLU module 957 may determine an intent of the user and a parameter using a matching rule divided into a domain, intent, and a parameter (or a slot) and may determine (or select) a path rule (e.g., a sequence of states) based on the determined intent of the user and the determined parameter. For example, the NLU module 957 may select an app to be executed based on an intent of the user and may determine an action to be performed in the selected app. Further, the NLU module 957 may determine (or select) a parameter corresponding to the determined action and may determine (or select) a path rule.

When the app to request the request of the user is not verified, in operation 1257, the processor 950 may perform an Internet search through a search engine (e.g., Google, Naver, or the like). For example, the search engine may perform an Internet search by using the text data as a search query. According to an embodiment, the processor 950 may transmit the result found through the search engine to the external device via the communication interface 910. For another example, the processor 950 may transmit a message (e.g., an error message) indicating that the app to process the request of the user is not verified to the external device.

Figure 13:
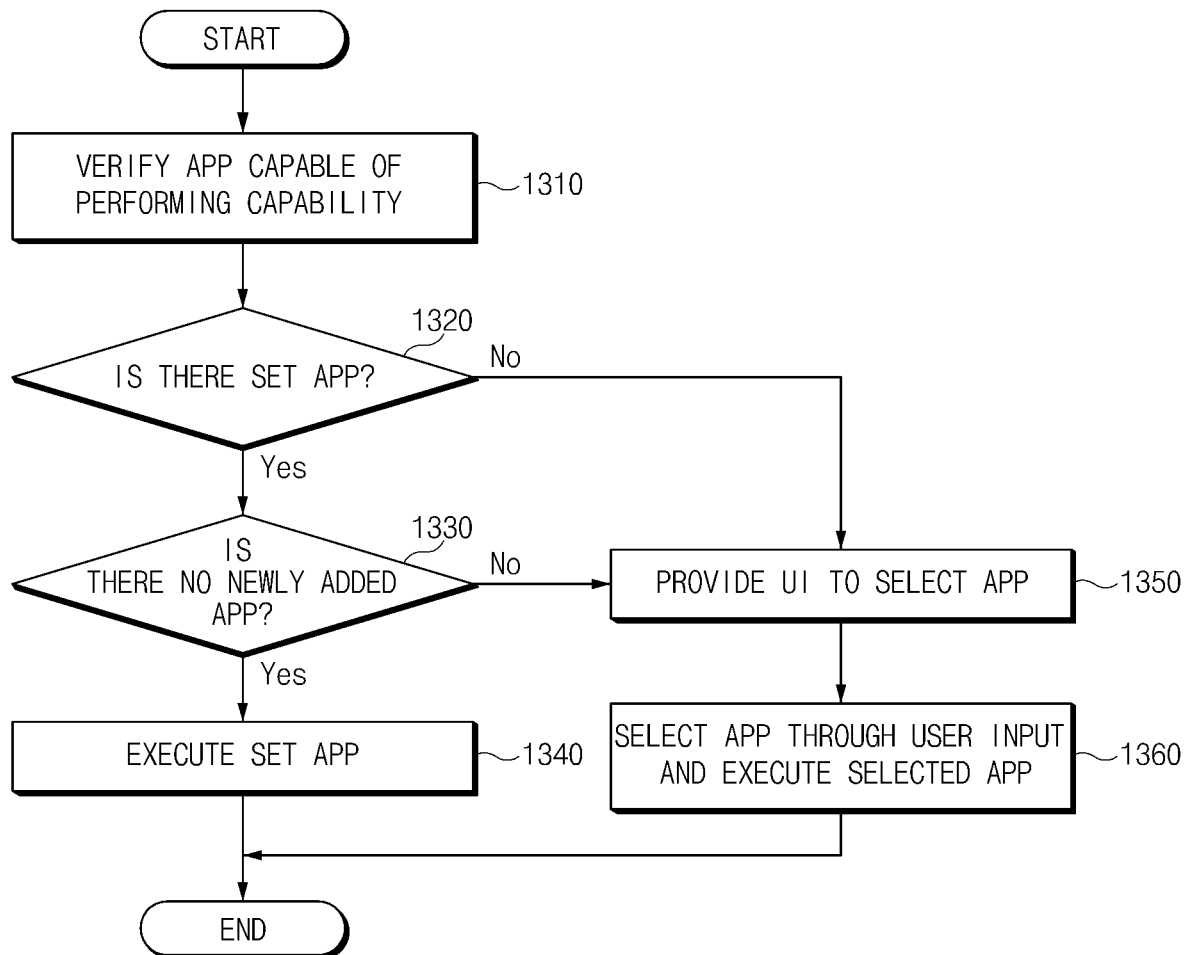
FIG. 13 is a flowchart illustrating an operation method of a system associated with setting an app to process a request of a user, according to an embodiment of the present disclosure.

FIG. 13 is a flowchart illustrating an operation method of a system associated with setting an app to process a request of a user, according to an embodiment of the present disclosure.

Referring to FIG. 13, a capability dispatcher 955 of a system 900 of FIG. 9 may classify a capability corresponding to a request of a user for each category of a service and may designate an app to perform the capability for each category of the service. In other words, the capability dispatcher 955 may designate a default app to perform a capability for each category of the service.

When it is determined whether an utterance of the user requests any capability, in operation 1310, the capability dispatcher 955 may verify an app capable of performing the capability. For example, the capability dispatcher 955 may verify an app list including apps capable of performing the capability from a memory 930 of FIG. 9.

In operation 1320, the capability dispatcher 955 may determine whether there is a set app (e.g., a preconfigured and/or default app) to perform the capability or requisite function. For example, the capability dispatcher 955 may verify whether there is a default app set to perform the capability among apps included in the app list.

When there is the set app (or the default app), in operation 1330, the capability dispatcher 955 may determine whether an app having the requisite capability has been recently installed or otherwise newly added. For example, the capability dispatcher 955 may receive information about an app included in the app list from an external server (e.g., an app store server capable of downloading an app, another intelligence server, or the like). For example, when information about a new app which is not included in the app list is received from the external server, the capability dispatcher 955 may add the new app to the app list.

When the app capable of performing the capability is not newly added, that is, when there is no the newly added app in the app list, in operation 1340, a processor 950 of FIG. 9 may execute the set app (or the default app). For example, the processor 950 may request an action processing service of the set app (or the default app) to execute an app to process a request of the user.

When there is no the set app (or the default app) or when the app capable of performing the capability is newly added (that is, when there is the newly added app in the app list), in operation 1350, the processor 950 may provide a UI to select the app to perform the capability. In some embodiments, the processor 950 may transmit data associated with the app to an external device (e.g., a user terminal 100) including a UI via a communication interface 910 of FIG. 9 such that the external device may provide a screen capable of selecting an app to the user. The screen capable of selecting the app may be, for example, a screen which displays an app list.

In operation 1360, the processor 950 may select an app to perform the capability through a user input. For example, when receiving a user input for selecting any one of apps included in the app list through a UI, the processor 950 may select an app to perform the capability based on the user input. For another example, the processor 950 may obtain a user input for selecting any one of the apps included in the app list from the external device via the communication interface 910 and may select an app to perform the capability based on the user input. Further, the processor 950 may execute the selected app. For example, the processor 950 may request an action processing service of the selected app to execute the app to process a request of the user. According to an embodiment, when the selected app is included (or installed) in an external server, the processor 950 may transmit a request to execute the selected app to the external server via the communication interface 910. Further, the external device (e.g., the user terminal 100) may receive the result of executing the selected app and may output the received result on its display.

As described above, according to various embodiments, a voice processing method of an electronic device may include receiving first data associated with a first user input obtained through a first external device, from the first external device including a microphone phone and a UI, via the network interface, performing ASR for the first data for providing a first text, verifying at least one application program based at least in part on the first text, when the at least one application program is verified, providing second data associated with the at least one application program to the first external device via the network interface such that the first external device indicates the at least one application program on the UI of the first external device, and when the at least one application program is not verified, performing NLU for the first text. The first user input may include a request to perform a task executable at least in part using at least one application program which is not indicated by the first user input.

According to various embodiments, the verifying of the at least one application program may include comparing the first text with at least one of a plurality of selected sentences, a plurality of selected phrases, or a plurality of selected words, the sentences, and the phrases, and the words being stored in a memory of the electronic device.

According to various embodiments, the performing of the NLU may include verifying a domain and intent based on the first text.

According to various embodiments, the at least one application program may include at least one of an application program downloadable from an app store, a web application program, or an application program which operates in a chatbot mode.

According to various embodiments, the method may further include performing an Internet search, when it fails to verify the at least one application program through the NLU.

According to various embodiments, the method may further include receiving a user selection on an application program of the at least one application program through the first external device, after the first external device indicates the at least one application program on the UI.

According to various embodiments, the method may further include allowing the first external device to perform the task based on the user selection.

According to various embodiments, the method may further include allowing the first external device to display the result of performing the task by an external server, based on the user selection.

According to various embodiments, the method may further include performing the task using selected one which is available to the selected application program among a downloadable application program, a web application program, or an application program which operates in a chatbot mode.

Figure 14:
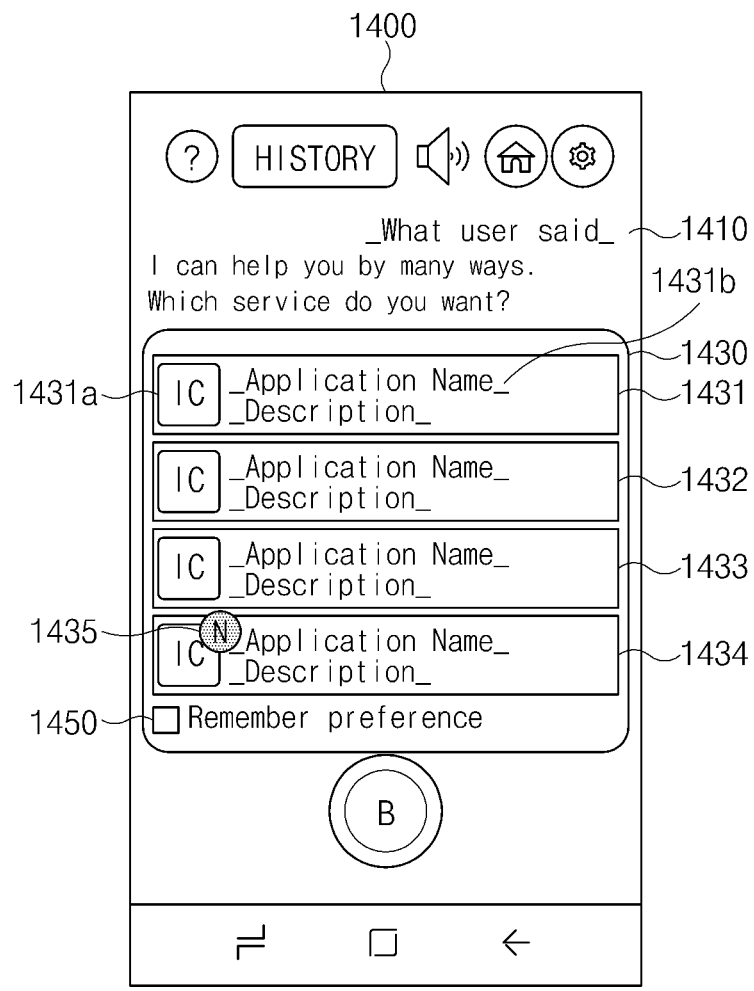
FIG. 14 is a drawing illustrating a screen for supporting to select an app to process a request of a user, according to an embodiment of the present disclosure.

FIG. 14 is a drawing illustrating a screen for supporting to select an app to process a request of a user, according to an embodiment of the present disclosure.

Referring to FIG. 14, an electronic device (e.g., a user terminal 100 of FIG. 2) including a UI (e.g., a display 120 of FIG. 2) may provide a screen 1400 for supporting selection of an app to process a request of a user through the UI.

According to an embodiment, the screen 1400 for supporting app selection may include text data 1410 corresponding to an voice input (e.g., an utterance) of the user, an app list 1430 including apps capable of processing requests of the user, or an icon or other display element 1450 selectable to request storing of preference information about any one of the apps included in the app list 1430.

According to an embodiment, the app list 1430 may include information about the apps capable of processing the request of the user. For example, the app list 1430 may include an identification image 1431a (e.g., an icon) of each of the apps or an identifier 1431b (e.g., a name) of each of the apps. The shown drawing illustrates a state where an item 1431 corresponding to a first app, an item 1432 corresponding to a second app, an item 1433 corresponding to a third app, and an item 1434 corresponding to a fourth app are included in the app list 1430. However, embodiments are not limited thereto. According to various embodiments, when a new app is added, an item corresponding to the new app may be further included in the app list 1430. In this case, the item corresponding to the new app may further include an image 1435 indicating a newly added app.

According to an embodiment, the button 1450 may operate in a toggle mode. For example, when the button 1450 is selected, an indication ("V") indicating that the button 1450 is selected may be added to a specified region of the button 1450. When the button 1450 is selected in a state where the indication is added, the indication may be deleted from the specified region of the button 1450 to indicate that the selection of the button 1450 is released.

Figure 15:
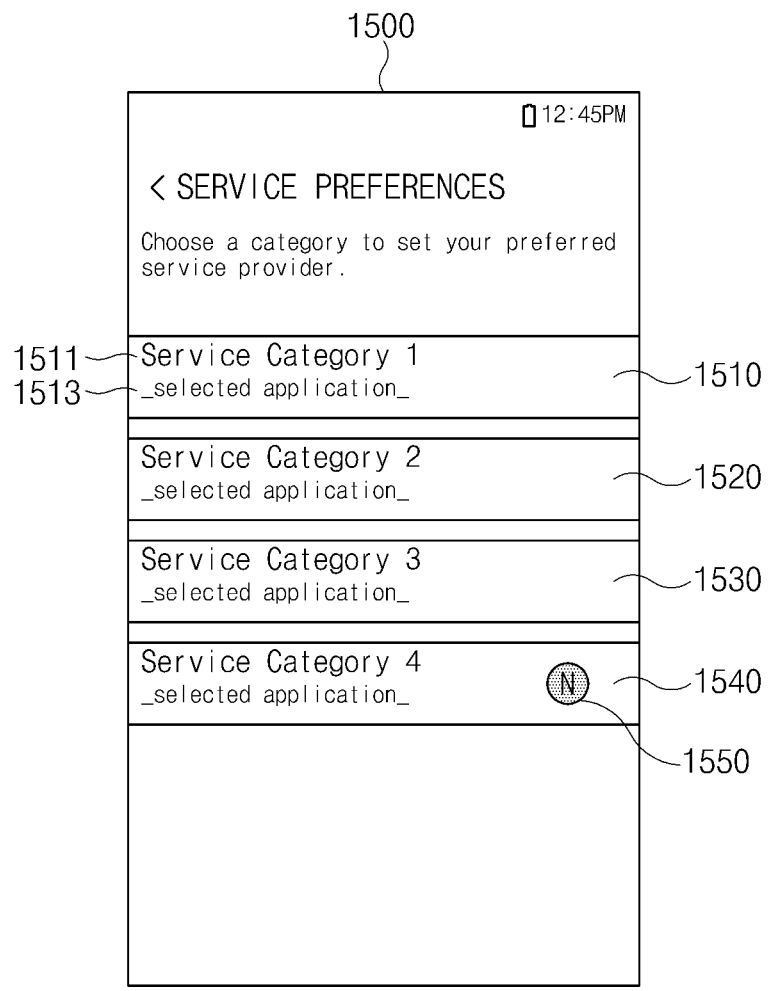
FIG. 15 is a drawing illustrating a screen for supporting to select an app to be executed for each capability corresponding to a request of a user, according to an embodiment of the present disclosure.

FIG. 15 is a drawing illustrating a screen for supporting to select an app to be executed for each capability corresponding to a request of a user, according to an embodiment of the present disclosure.

Referring to FIG. 15, an electronic device (e.g., a user terminal 100) including a UI (e.g., a display 120) may provide a screen 1500 supporting selection of an app among a number of apps supporting a function or capability matching a request of a user. The screen 1500 may be displayed through a UI as shown in the example.

According to an embodiment, the screen 1500 for supporting app selection may include items corresponding to a type of a capability (e.g., an item 1510 corresponding to a first capability, an item 1520 corresponding to a second capability, an item 1530 corresponding to a third capability, an item 1540 corresponding to a fourth capability, or the like). Each of the items may include category information 1511 of a service classified according to a type of a capability or app information 1513 set to provide the service.

According to an embodiment, the category information 1511 of the service may include, for example, information associated with food delivery, entertainment information provision, sports information provision, knowledge provision, transportation reservation, e-mail transmission, music playback, or the like.

According to an embodiment, the app information 1513 set to provide the service may include, for example, information about a default app to perform a capability corresponding to the service. For example, the app information 1513 may include an identification image (e.g., an icon) of the default app or an identifier (e.g., a name) of the default app.

According to an embodiment, when a type of the capability is added or when the app information 1513 set to provide a service corresponding to the capability is changed or added, an image 1550 indicating newly added information may be included in a newly added item.

Figure 16:
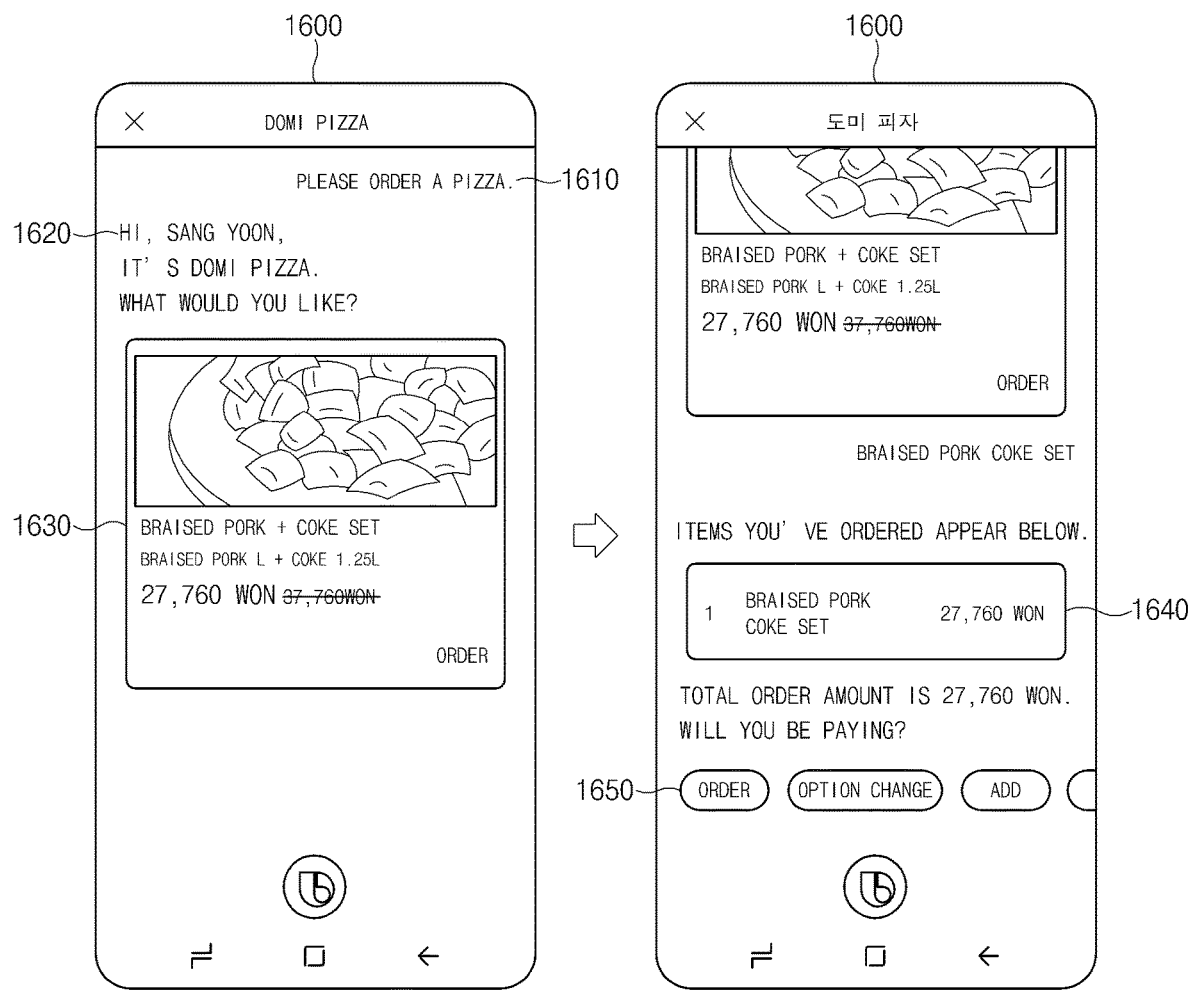
FIG. 16 is a drawing illustrating a screen where an action of an app is executed in a chatbot mode, according to an embodiment of the present disclosure.

FIG. 16 is a drawing illustrating a screen where an action of an app is executed in a chatbot mode, according to an embodiment of the present disclosure. A "chatbot" may indicate an algorithmic user interface which receives inputs and generates outputs simulating natural conversation with a user, and is also referred to as an interactive agent or an artificial conversational entity.

Referring to FIG. 16, an app capable of processing a user request may be executed in a chatbot mode. For example, a system 900 of FIG. 9 may request a first external device to execute the chatbot and process a request of the user. Further, the system 900 may request a second external device capable of receiving an utterance of the user to execute an app (e.g., a chatbot app) capable of connection with the chatbot. The shown drawing illustrates a screen 1600 where the app is executed in the second external device.

The screen 1600 illustrates an example embodiment in which an app capable of communicative connection with the chatbot is executed, which may include display of first text data 1610 indicating the voice command (e.g., an utterance) of the user, second text data 1620 indicating the reply of the chatbot including a request for further information (which is received from the first external device), and recommendation information 1630 as output by the chatbot, which is received from the first external device, and lastly details information 1640 generated in association with the recommendation information 1630, or the like—which in this case is an order confirmation and receipt. According to an embodiment, the screen 1600 may further include a button 1650 selectable to execute payment.

Figure 17:
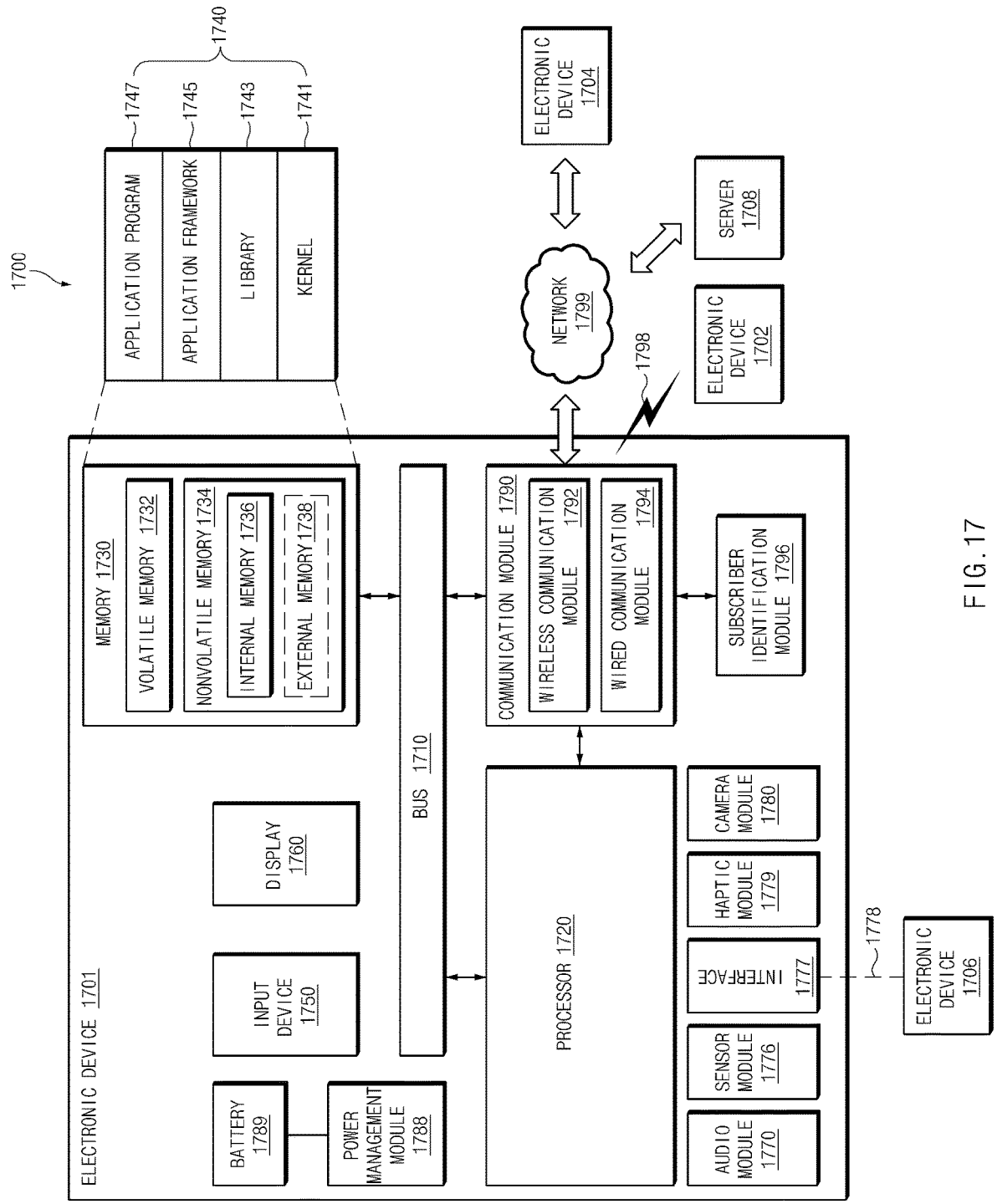
FIG. 17 illustrates a block diagram of an electronic device in a network environment, according to various embodiments.

FIG. 17 illustrates a block diagram of an electronic device 1701 in a network environment 1700, according to various embodiments. An electronic device according to various embodiments of this disclosure may include various forms of devices. For example, the electronic device may include at least one of, for example, portable communication devices (e.g., smartphones), computer devices (e.g., personal digital assistants (PDAs), tablet personal computers (PCs), laptop PCs, desktop PCs, workstations, or servers), portable multimedia devices (e.g., electronic book readers or Motion Picture Experts Group (MPEG-1 or MPEG-2) Audio Layer 3 (MP3) players), portable medical devices (e.g., heartbeat measuring devices, blood glucose monitoring devices, blood pressure measuring devices, and body temperature measuring devices), cameras, or wearable devices. The wearable device may include at least one of an accessory type (e.g., watches, rings, bracelets, anklets, necklaces, glasses, contact lens, or head-mounted-devices (HMDs)), a fabric or garment-integrated type (e.g., an electronic apparel), a body-attached type (e.g., a skin pad or tattoos), or a bio-implantable type (e.g., an implantable circuit). According to various embodiments, the electronic device may include at least one of, for example, televisions (TVs), digital versatile disk (DVD) players, audios, audio accessory devices (e.g., speakers, headphones, or headsets), refrigerators, air conditioners, cleaners, ovens, microwave ovens, washing machines, air cleaners, set-top boxes, home automation control panels, security control panels, game consoles, electronic dictionaries, electronic keys, camcorders, or electronic picture frames.

In another embodiment, the electronic device may include at least one of navigation devices, satellite navigation system (e.g., Global Navigation Satellite System (GNSS)), event data recorders (EDRs) (e.g., black box for a car, a ship, or a plane), vehicle infotainment devices (e.g., head-up display for vehicle), industrial or home robots, drones, automatic teller's machines (ATMs), points of sales (POSs), measuring instruments (e.g., water meters, electricity meters, or gas meters), or internet of things (e.g., light bulbs, sprinkler devices, fire alarms, thermostats, or street lamps). The electronic device according to an embodiment of this disclosure may not be limited to the above-described devices, and may provide functions of a plurality of devices like smartphones which has measurement function of personal biometric information (e.g., heart rate or blood glucose). In this disclosure, the term "user" may refer to a person who uses an electronic device or may refer to a device (e.g., an artificial intelligence electronic device) that uses the electronic device.

Referring to FIG. 17, under the network environment 1700, the electronic device 1701 (e.g., the user terminal 100) may communicate with an electronic device 1702 through local wireless communication 1798 or may communication with an electronic device 1704 or a server 1708 (e.g., the intelligence server 200 or an app store server) through a network 1799. According to an embodiment, the electronic device 1701 may communicate with the electronic device 1704 through the server 1708.

According to an embodiment, the electronic device 1701 may include a bus 1710, a processor 1720 (e.g., the processor 150), a memory 1730 (e.g., the memory 140), an input device 1750 (e.g., the input module 110)(e.g., a micro-phone or a mouse), a display device 1760 (e.g., the display 120), an audio module 1770 (e.g., the speaker 130), a sensor module 1776, an interface 1777, a haptic module 1779, a camera module 1780, a power management module 1788, a battery 1789, a communication module 1790, and a subscriber identification module 1796. According to an embodiment, the electronic device 1701 may not include at least one (e.g., the display device 1760 or the camera module 1780) of the above-described elements or may further include other element(s).

The bus 1710 may interconnect the above-described elements 1720 to 1790 and may include a circuit for conveying signals (e.g., a control message or data) between the above-described elements.

The processor 1720 may include one or more of a central processing unit (CPU), an application processor (AP), a graphic processing unit (GPU), an image signal processor (ISP) of a camera or a communication processor (CP). According to an embodiment, the processor 1720 may be implemented with a system on chip (SoC) or a system in package (SiP). For example, the processor 1720 may drive an operating system (OS) or an application to control at least one of another element (e.g., hardware or software element) connected to the processor 1720 and may process and compute various data. The processor 1720 may load a command or data, which is received from at least one of other elements (e.g., the communication module 1790), into a volatile memory 1732 to process the command or data and may store the result data into a nonvolatile memory 1734.

The memory 1730 may include, for example, the volatile memory 1732 or the nonvolatile memory 1734. The volatile memory 1732 may include, for example, a random access memory (RAM) (e.g., a dynamic RAM (DRAM), a static RAM (SRAM), or a synchronous DRAM (SDRAM)). The nonvolatile memory 1734 may include, for example, a programmable read-only memory (PROM), an one time PROM (OTPROM), an erasable PROM (EPROM), an electrically EPROM (EEPROM), a mask ROM, a flash ROM, a flash memory, a hard disk drive (HDD), or a solid-state drive (SSD). In addition, the nonvolatile memory 1734 may be configured in the form of an internal memory 1736 or the form of an external memory 1738 which is available through connection if desired, according to the connection with the electronic device 1701. The external memory 1738 may further include a flash drive such as compact flash (CF), secure digital (SD), micro secure digital (Micro-SD), mini secure digital (Mini-SD), extreme digital (xD), a multimedia card (MMC), or a memory stick. The external memory 1738 may be operatively or physically connected with the electronic device 1701 in a wired manner (e.g., a cable or a universal serial bus (USB)) or a wireless (e.g., Bluetooth) manner.

For example, the memory 1730 may store, for example, at least one different software element, such as an instruction or data associated with the program 1740, of the electronic device 1701. The program 1740 may include, for example, a kernel 1741, a library 1743, an application framework 1745 or an application program (interchangeably, "application") 1747.

The input device 1750 may include a microphone, a mouse, or a keyboard. According to an embodiment, the keyboard may include a keyboard physically connected or a virtual keyboard displayed through the display 1760.

The display 1760 may include a display, a hologram device or a projector, and a control circuit to control a relevant device. The screen may include, for example, a liquid crystal display (LCD), a light emitting diode (LED) display, an organic LED (OLED) display, a microelectromechanical systems (MEMS) display, or an electronic paper display. According to an embodiment, the display may be flexibly, transparently, or wearably implemented. The display may include a touch circuitry, which is able to detect a user's input such as a gesture input, a proximity input, or a hovering input or a pressure sensor (interchangeably, a force sensor) which is able to measure the intensity of the pressure by the touch. The touch circuit or the pressure sensor may be implemented integrally with the display or may be implemented with at least one sensor separately from the display. The hologram device may show a stereoscopic image in a space using interference of light. The projector may project light onto a screen to display an image. The screen may be located inside or outside the electronic device 1701.

The audio module 1770 may convert, for example, from a sound into an electrical signal or from an electrical signal into the sound. According to an embodiment, the audio module 1770 may acquire sound through the input device 1750 (e.g., a microphone) or may output sound through an output device (not illustrated) (e.g., a speaker or a receiver) included in the electronic device 1701, an external electronic device (e.g., the electronic device 1702 (e.g., a wireless speaker or a wireless headphone)) or an electronic device 1706 (e.g., a wired speaker or a wired headphone) connected with the electronic device 1701.

The sensor module 1776 may measure or detect, for example, an internal operating state (e.g., power or temperature) of the electronic device 1701 or an external environment state (e.g., an altitude, a humidity, or brightness) to generate an electrical signal or a data value corresponding to the information of the measured state or the detected state. The sensor module 1776 may include, for example, at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint senor, a heartbeat rate monitoring (HRM) sensor, an e-nose sensor, an electromyography (EMG) sensor, an electroencephalogram (EEG) sensor, an electrocardiogram (ECG) sensor), a temperature sensor, a humidity sensor, an illuminance sensor, or an UV sensor. The sensor module 1776 may further include a control circuit for controlling at least one or more sensors included therein. According to an embodiment, the sensor module 1776 may be controlled by using the processor 1720 or a processor (e.g., a sensor hub) separate from the processor 1720. In the case that the separate processor (e.g., a sensor hub) is used, while the processor 1720 is in a sleep state, the separate processor may operate without awakening the processor 1720 to control at least a portion of the operation or the state of the sensor module 1776.

According to an embodiment, the interface 1777 may include a high definition multimedia interface (HDMI), a universal serial bus (USB), an optical interface, a recommended standard 232 (RS-232), a D-subminiature (D-sub), a mobile high-definition link (MI-IL) interface, a SD card/MMC (multi-media card) interface, or an audio interface. A connector 1778 may physically connect the electronic device 1701 and the electronic device 1706. According to an embodiment, the connector 1778 may include, for example, an USB connector, an SD card/MMC connector, or an audio connector (e.g., a headphone connector).

The haptic module 1779 may convert an electrical signal into mechanical stimulation (e.g., vibration or motion) or into electrical stimulation. For example, the haptic module 1779 may apply tactile or kinesthetic stimulation to a user. The haptic module 1779 may include, for example, a motor, a piezoelectric element, or an electric stimulator.

The camera module 1780 may capture, for example, a still image and a moving picture. According to an embodiment, the camera module 1780 may include at least one lens (e.g., a wide-angle lens and a telephoto lens, or a front lens and a rear lens), an image sensor, an image signal processor, or a flash (e.g., a light emitting diode or a xenon lamp).

The power management module 1788, which is to manage the power of the electronic device 1701, may include at least a portion of a power management integrated circuit (PMIC).

The battery 1789 may include a primary cell, a secondary cell, or a fuel cell and may be recharged by an external power source to supply power at least one element of the electronic device 1701.

The communication module 1790 may establish a communication channel between the electronic device 1701 and an external device (e.g., the first external electronic device 1702, the second external electronic device 1704, or the server 1708). The communication module 1790 may support wired communication or wireless communication through the established communication channel. According to an embodiment, the communication module 1790 may include a wireless communication module 1792 or a wired communication module 1794. The communication module 1790 may communicate with the external device through a first network 1798 (e.g. a wireless local area network such as Bluetooth or infrared data association (IrDA)) or a second network 1799 (e.g., a wireless wide area network such as a cellular network) through a relevant module among the wireless communication module 1792 or the wired communication module 1794.

The wireless communication module 1792 may support, for example, cellular communication, local wireless communication, global navigation satellite system (GNSS) communication. The cellular communication may include, for example, long-term evolution (LTE), LTE Advance (LTE-A), code division multiple access (CMA), wideband CDMA (WCDMA), universal mobile telecommunications system (UMTS), wireless broadband (WiBro), or global system for mobile communications (GSM). The local wireless communication may include wireless fidelity (Wi-Fi), WiFi Direct, light fidelity (Li-Fi), Bluetooth, Bluetooth low energy (BLE), Zigbee, near field communication (NFC), magnetic secure transmission (MST), radio frequency (RF), or a body area network (BAN). The GNSS may include at least one of a global positioning system (GPS), a global navigation satellite system (Glonass), Beidou Navigation Satellite System (Beidou), the European global satellite-based navigation system (Galileo), or the like. In the present disclosure, "GPS" and "GNSS" may be interchangeably used.

According to an embodiment, when the wireless communication module 1792 supports cellar communication, the wireless communication module 1792 may, for example, identify or authenticate the electronic device 1701 within a communication network using the subscriber identification module (e.g., a SIM card) 1796. According to an embodiment, the wireless communication module 1792 may include a communication processor (CP) separate from the processor 1720 (e.g., an application processor (AP)). In this case, the communication processor may perform at least a portion of functions associated with at least one of elements 1710 to 1796 of the electronic device 1701 in substitute for the processor 1720 when the processor 1720 is in an inactive (sleep) state, and together with the processor 1720 when the processor 1720 is in an active state. According to an embodiment, the wireless communication module 1792 may include a plurality of communication modules, each supporting a relevant communication scheme among cellular communication, local wireless communication, or a GNSS communication.

The wired communication module 1794 may include, for example, include a local area network (LAN) service, a power line communication, or a plain old telephone service (POTS).

For example, the first network 1798 may employ, for example, Wi-Fi direct or Bluetooth for transmitting or receiving one or more instructions or data through wireless direct connection between the electronic device 1701 and the first external electronic device 1702. The second network 1799 may include a telecommunication network (e.g., a computer network such as a LAN or a WAN, the Internet or a telephone network) for transmitting or receiving one or more instructions or data between the electronic device 1701 and the second electronic device 1704.

According to various embodiments, the one or more instructions or the data may be transmitted or received between the electronic device 1701 and the second external electronic device 1704 through the server 1708 connected with the second network 1799. Each of the first and second external electronic devices 1702 and 1704 may be a device of which the type is different from or the same as that of the electronic device 1701. According to various embodiments, all or a part of operations that the electronic device 1701 will perform may be executed by another or a plurality of electronic devices (e.g., the electronic devices 1702 and 1704 or the server 1708). According to an embodiment, in the case that the electronic device 1701 executes any function or service automatically or in response to a request, the electronic device 1701 may not perform the function or the service internally, but may alternatively or additionally transmit requests for at least a part of a function associated with the electronic device 1701 to any other device (e.g., the electronic device 1702 or 1704 or the server 1708). The other electronic device (e.g., the electronic device 1702 or 1704 or the server 1708) may execute the requested function or additional function and may transmit the execution result to the electronic device 1701. The electronic device 1701 may provide the requested function or service using the received result or may additionally process the received result to provide the requested function or service. To this end, for example, cloud computing, distributed computing, or client-server computing may be used.

Various embodiments of the present disclosure and terms used herein are not intended to limit the technologies described in the present disclosure to specific embodiments, and it should be understood that the embodiments and the terms include modification, equivalent, and/or alternative on the corresponding embodiments described herein. With regard to description of drawings, similar elements may be marked by similar reference numerals. The terms of a singular form may include plural forms unless otherwise specified. In the disclosure disclosed herein, the expressions "A or B", "at least one of A and/or B", "at least one of A and/or B", "A, B, or C", or "at least one of A, B, and/or C", and the like used herein may include any and all combinations of one or more of the associated listed items. Expressions such as "first," or "second," and the like, may express their elements regardless of their priority or importance and may be used to distinguish one element from another element but is not limited to these components. When an (e.g., first) element is referred to as being "(operatively or communicatively) coupled with/to" or "connected to" another (e.g., second) element, it may be directly coupled with/to or connected to the other element or an intervening element (e.g., a third element) may be present.

According to the situation, the expression "adapted to or configured to" used herein may be interchangeably used as, for example, the expression "suitable for", "having the capacity to", "changed to", "made to", "capable of" or "designed to" in hardware or software. The expression "a device configured to" may mean that the device is "capable of" operating together with another device or other components. For example, a "processor configured to (or set to) perform A, B, and C" may mean a dedicated processor (e.g., an embedded processor) for performing corresponding operations or a generic-purpose processor (e.g., a central processing unit (CPU) or an application processor) which performs corresponding operations by executing one or more software programs which are stored in a memory device (e.g., the memory 1730).

The term "module" used herein may include a unit, which is implemented with hardware, software, or firmware, and may be interchangeably used with the terms "logic", "logical block", "component", "circuit", or the like. The "module" may be a minimum unit of an integrated component or a part thereof or may be a minimum unit for performing one or more functions or a part thereof. The "module" may be implemented mechanically or electronically and may include, for example, an application-specific IC (ASIC) chip, a field-programmable gate array (FPGA), and a programmable-logic device for performing some operations, which are known or will be developed.

According to various embodiments, at least a part of an apparatus (e.g., modules or functions thereof) or a method (e.g., operations) may be, for example, implemented by instructions stored in a computer-readable storage media (e.g., the memory 1730) in the form of a program module. The instruction, when executed by a processor (e.g., a processor 1720), may cause the processor to perform a function corresponding to the instruction. The computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), an embedded memory, and the like. The one or more instructions may contain a code made by a compiler or a code executable by an interpreter.

Each element (e.g., a module or a program module) according to various embodiments may be implemented as a single entity or a plurality of entities, a part of the above-described sub-elements may be omitted or may further include other sub-elements. Alternatively or additionally, after being integrated in one entity, some elements (e.g., a module or a program module) may identically or similarly perform the function executed by each corresponding element before integration. According to various embodiments, operations executed by modules, program modules, or other elements may be executed by a successive method, a parallel method, a repeated method, or a heuristic method, or at least one part of operations may be executed in different sequences or omitted. Alternatively, other operations may be added.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device, comprising:
a network interface;
at least one processor operatively connected with the network interface; and
at least one memory storing instructions and operatively connected with the at least one processor, the instructions executable by the at least one processor to:
receive a voice input through the network interface as transmitted from a first external device, the voice input including a request to execute a function using at least one application which is not indicated in the voice input,
extract a first text from the voice input by executing automatic speech recognition (ASR) on the voice input,
when the at least one application is identified based at least in part on the first text, transmit, through the network interface to the first external device, second data associated with the identified at least one application for display by the first external device, and
when the at least one application is not identified based at least in part on the first text, reattempt identification of the at least one application by executing natural language understanding (NLU) on the first text to determine the at least one application capable of executing the function.

2. The electronic device of claim 1, wherein the instructions cause the at least one processor to:
identify the at least one application program by comparing the first text with at least one of a plurality of prestored sentences, a plurality of prestored phrases, and a plurality of prestored words.

3. The electronic device of claim 1, wherein the instructions cause the at least one processor to:
perform the NLU on the first text to identify a domain indicating a set of prestored user intents indicated by the first text.

4. The electronic device of claim 1, wherein the identified at least one application program comprises at least one of an application program downloadable from an app store, a web application program, and an interactive agent program.

5. The electronic device of claim 1, wherein the instructions cause the at least one processor to:
when the at least one application is not identified by executing NLU, execute an Internet search on the first text.

6. The electronic device of claim 1, wherein the instructions cause the at least one processor to:
after the second data is transmitted to the first external device for display, receive a user selection as transmitted from the first external device.

7. The electronic device of claim 6, wherein the instructions cause the at least one processor to:
transmit to the first external device an indication allowing performance of the function based on the user selection.

8. The electronic device of claim 6, wherein the instructions cause the at least one processor to:
transmit to the first external device a second indication allowing display of a result of performance of the function by an external server, based on the user selection.

9. The electronic device of claim 6, wherein the instructions cause the at least one processor to:
execute the function according to selection of a function available to the identified at least one application, the function derived from at least one of a downloadable application program, a web application program, and an interactive agent program.

10. A method in an electronic device, the method comprising:
receiving a voice input through a network interface as transmitted from a first external device, the voice input including a request to execute a function using at least one application which is not indicated in the voice input,
extracting, by at least one processor, a first text from the voice input by executing automatic speech recognition (ASR) on the voice input,
when the at least one application is identified based at least in part on the first text, transmitting, through the network interface to the first external device, second data associated with the identified at least one application for display by the first external device, and
when the at least one application is not identified based at least in part on the first text, reattempting identification of the at least one application by executing natural language understanding (NLU) on the first text to determine the at least one application capable of executing the function.

11. The method of claim 10, further comprising:
identifying the at least one application program by comparing the first text with at least one of a plurality of prestored sentences, a plurality of prestored phrases, and a plurality of prestored words.

12. The method of claim 10, further comprising:
performing the NLU on the first text to identify a domain indicating a set of prestored user intents indicated by the first text.

13. The method of claim 10, wherein the identified at least one application program comprises at least one of an application program downloadable from an app store, a web application program, and an interactive agent program.

14. The method of claim 10, further comprising:
when the at least one application is not identified by executing NLU, executing an Internet search on the first text.

15. The method of claim 10, further comprising:
after the second data is transmitted to the first external device for display, receiving a user selection as transmitted from the first external device.

16. The method of claim 15, further comprising:
transmitting to the first external device an indication allowing performance of the function based on the user selection.

17. The method of claim 15, further comprising:
transmitting to the first external device a second indication allowing display of a result of performance of the function by an external server, based on the user selection.

18. The method of claim 15, further comprising:
executing the function according to selection of a function available to the identified at least one application, the function derived from at least one of a downloadable application program, a web application program, and an interactive agent program.

* * * * *